(12) United States Patent
Nakagawa et al.

(10) Patent No.: US 7,246,486 B2
(45) Date of Patent: Jul. 24, 2007

(54) COMBINATION OF SELECTED OPIOIDS WITH OTHER ACTIVE SUBSTANCES FOR USE IN THE THERAPY OF URINARY INCONTINENCE

(75) Inventors: Shinji Nakagawa, Hitachinaka (JP); Toshio Hori, Hitachinaka (JP); Mamoru Nemoto, Hitachinaka (JP); Masami Nagano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/545,901

(22) PCT Filed: Apr. 30, 2003

(86) PCT No.: PCT/EP03/05529

§ 371 (c)(1),
(2), (4) Date: Aug. 17, 2005

(87) PCT Pub. No.: WO03/099268

PCT Pub. Date: Dec. 4, 2003

(65) Prior Publication Data

US 2006/0168942 A1   Aug. 3, 2006

(30) Foreign Application Priority Data

May 29, 2002 (DE) ................. 102 24 107

(51) Int. Cl.
*F01N 3/00* (2006.01)
(52) U.S. Cl. ............... 60/285; 60/276; 60/286; 60/297

(58) Field of Classification Search ......... 60/276, 60/285, 286, 297, 301, 278
See application file for complete search history.

(56) References Cited

U.S. PATENT DOCUMENTS

| 6,101,809 | A | 8/2000 | Ishizuka et al. | |
|---|---|---|---|---|
| 6,250,074 | B1* | 6/2001 | Suzuki et al. | 60/285 |
| 6,345,496 | B1* | 2/2002 | Fuwa et al. | 60/274 |
| 6,490,855 | B1* | 12/2002 | Bidner et al. | 60/274 |
| 6,553,757 | B1* | 4/2003 | Surnilla et al. | 60/285 |
| 6,725,650 | B2* | 4/2004 | Nishimura | 60/285 |
| 7,003,944 | B2* | 2/2006 | Surnilla et al. | 60/285 |

FOREIGN PATENT DOCUMENTS

| EP | 898 067 | 2/1999 |
|---|---|---|
| JP | 8-296471 | 11/1996 |
| JP | 8-296472 | 11/1996 |
| JP | 9-112308 | 4/1997 |
| JP | 11-62666 | 3/1999 |

(Continued)

*Primary Examiner*—Binh Q. Tran
(74) *Attorney, Agent, or Firm*—Crowell & Moring LLP

(57) ABSTRACT

An internal combustion engine control device for, in a lean-burn internal combustion engine provided with a three-way catalyst and a lean NOx catalyst in an exhaust system, optimizing an air/fuel ratio in a rich mode from the viewpoints of both better fuel economy and exhaust emission control when NOx having been stored in a lean NOx catalyst during a lean operation is desorbed and cleaned by switching to a rich operation.

An internal combustion engine control device for controlling an air/fuel ratio during the rich operation to be changed between a period of desorbing $O_2$ stored in the three-way catalyst and a period of desorbing and cleaning NOx stored in the lean NOx catalyst.

6 Claims, 36 Drawing Sheets

FOREIGN PATENT DOCUMENTS

| | | |
|---|---|---|
| JP | 11-169670 | 6/1999 |
| JP | 2000-64822 | 2/2000 |
| JP | 2000-230421 | 8/2000 |
| JP | 2001-59440 | 3/2001 |
| JP | 2001-132440 | 5/2001 |
| JP | 2002-13414 | 1/2002 |
| JP | 2002-70611 | 3/2002 |
| JP | 2003-56379 | 2/2003 |
| JP | 2003-201888 | 7/2003 |
| JP | 2003-214236 | 7/2003 |
| WO | 00/60229 | 10/2000 |

* cited by examiner

FIG. 4
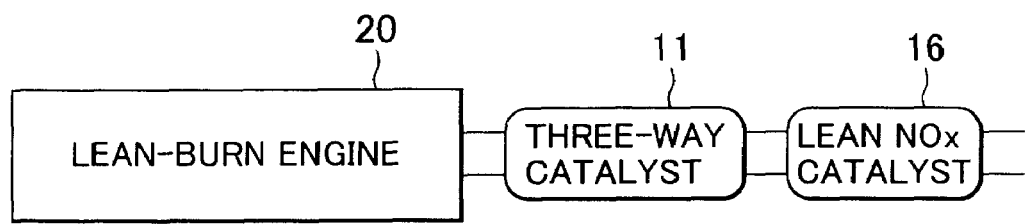
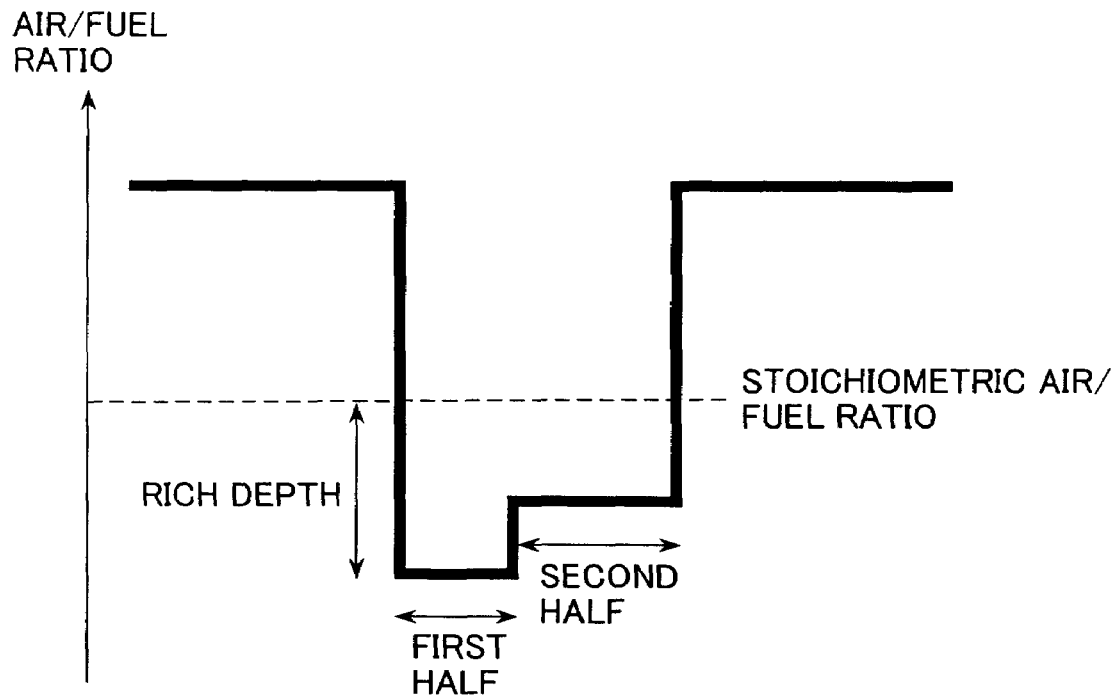

FIG. 5
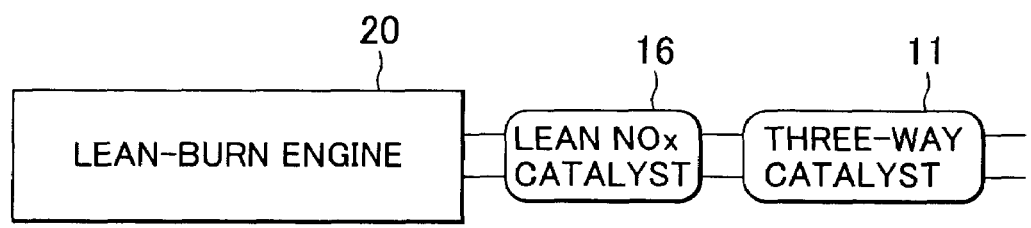
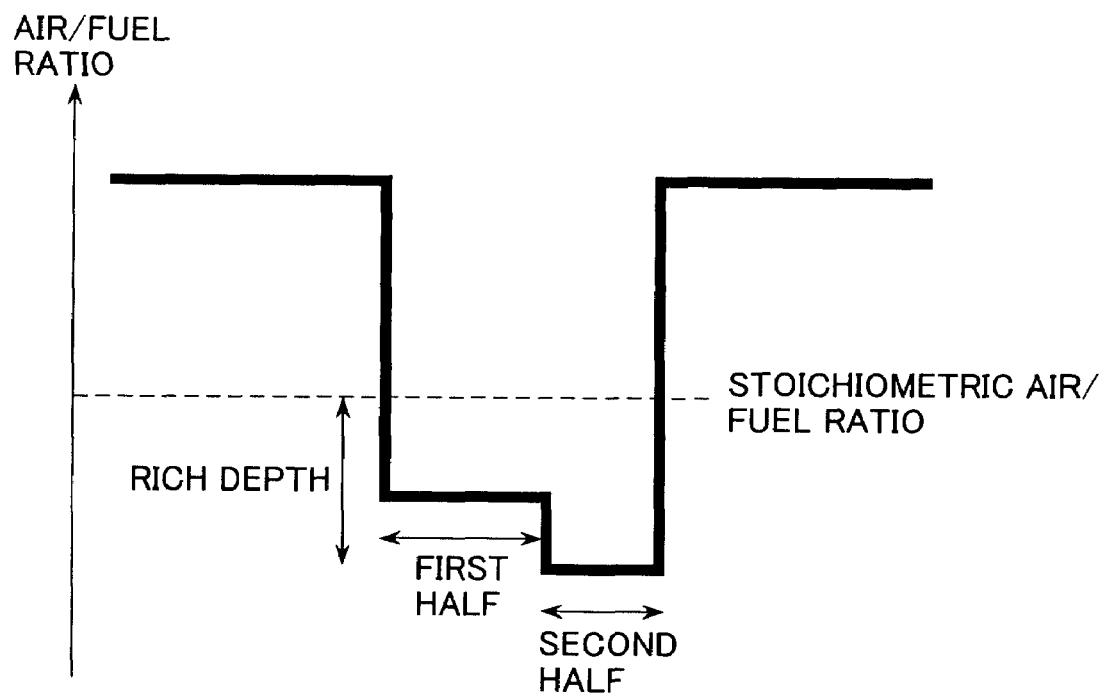

FIG. 23

|  | THREE-WAY CATALYST | LEAN NOx CATALYST |
|---|---|---|
| RICH SPIKE TIME | PERIOD IN WHICH STORED O2 OXIDIZES HC AND CO | PERIOD IN WHICH STORED NOx OXIDIZES CO |
| RICH SPIKE DEPTH | INCREASE | INCREASE UP TO ALLOWABLE AMOUNT OF DISCHATGED HC |

FIG. 24   FUEL AMOUNT REQUIRED FOR CONSUMING STORED O2 [g]
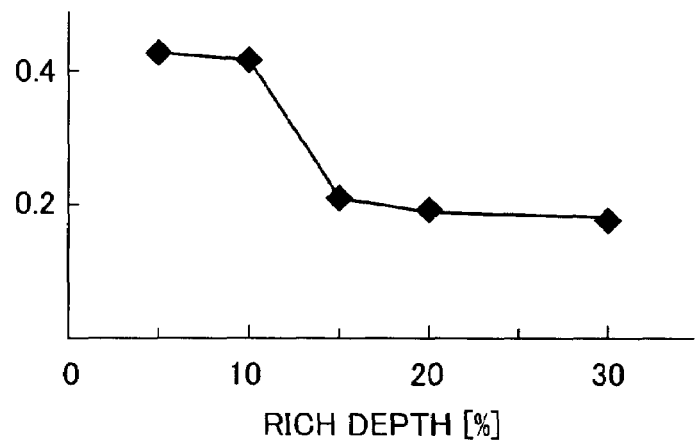
FIG. 25   FUEL AMOUNT REQUIRED FOR CONSUMING STORED NOx [g]
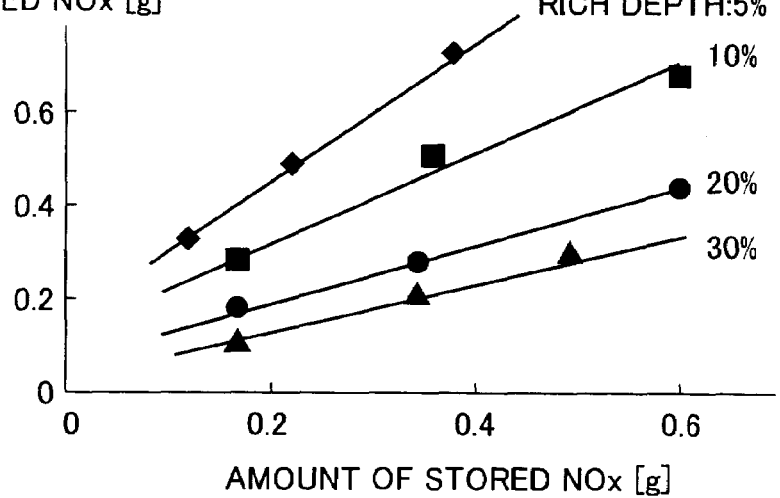

US 7,246,486 B2

COMBINATION OF SELECTED OPIOIDS WITH OTHER ACTIVE SUBSTANCES FOR USE IN THE THERAPY OF URINARY INCONTINENCE

TECHNICAL FIELD

The present invention relates to an internal combustion engine control device. More particularly, the present invention relates to an internal combustion engine control device for, in a lean-burn internal combustion engine being able to make combustion at an air/fuel ratio varying over a wide range and provided with an exhaust emission cleaner including a three-way catalyst and a lean NOx catalyst, optimizing the air/fuel ratio in a rich operation from the viewpoints of both better fuel economy and improved cleaning of exhaust emissions when NOx having been stored in the lean NOx catalyst during a lean operation is desorbed and cleaned by switching to the rich operation.

BACKGROUND ART

Recently, against the background of worldwide efforts addressing the problems of global warming and energy, development of internal combustion engines with lower fuel consumption has been demanded in the field of vehicles as well, including automobiles and others. The most notable example is a lean-burn internal combustion engine. In particular, a direct injection internal combustion engine is more effective in reducing fuel consumption than the known intake-port injection internal combustion engine, because the former engine enables combustion to be performed at an air/fuel ratio of not less than 40 by directly injecting fuel in a cylinder to produce a stratified air-fuel mixture.

On the other hand, against recognition of environmental problems such as air pollution, development of internal combustion engines with low-pollution exhaust gases has also been demanded and specific exhaust emission control has been legislated in various countries over the world at standards becoming severer year by year. Because a three-way catalyst cannot clean NOx discharged from the internal combustion engine during a lean operation, the lean-burn internal combustion engine generally includes a lean NOx catalyst to clean NOx during the lean operation.

During the lean operation of the internal combustion engine, i.e., in an oxidizing atmosphere, the lean NOx catalyst stores NOx and oxidizes and cleans HC, CO. Also, to clean the stored NOx, the lean NOx catalyst has the function of desorbing the stored NOx and causing oxidation-reduction reactions between the NOx and a reductant (H2, CO and HC) discharged from the internal combustion engine when the internal combustion engine is operated in a mode of rich operation, i.e., in a reducing atmosphere.

That rich operation of the internal combustion engine is generally called a rich spike or rich spike control. During the rich spike, there occur not only deterioration of fuel economy, but also deterioration in cleaning of exhaust emissions if the oxidation-reduction reactions between the stored NOx and CO, HC discharged from the internal combustion engine are insufficient. It is therefore required to optimize a rich spike control process applied to the lean NOx catalyst from the viewpoints of both better fuel economy and improved cleaning of the exhaust emissions.

On the other hand, to be adapted for exhaust emission control legislated at standards becoming severer, as mentioned above, it has also become popular in the lean-burn internal combustion engine to separately dispose a three-way catalyst in addition to the lean NOx catalyst for the purposes of reducing the exhaust emissions at the startup and reducing the exhaust emissions during a stoichiometric operation.

The three-way catalyst is generally loaded with precious metals, i.e., Pd, Pt and Rh, and an oxygen storing agent, represented by Ce, with intent to increase cleaning efficiency during the stoichiometric operation. The oxygen storing agent has the function of storing oxygen in an oxidizing atmosphere and releasing the stored oxygen in a reducing atmosphere, and it serves to suppress deterioration in cleaning of the exhaust emissions by moderating a shift of the air/fuel ratio from the stoichiometric ratio within the three-way catalyst.

However, when the three-way catalyst is applied to the lean-burn internal combustion engine, oxygen is stored in the three-way catalyst during the lean operation. For example, in the case of the three-way catalyst being arranged upstream and the lean NOx catalyst being arranged downstream, therefore, the oxygen stored in the upstream three-way catalyst is released and oxidizes the reductant discharged from the internal combustion engine during the rich spike. For that reason, to introduce reducing gases to the lean NOx catalyst, the oxygen stored in the upstream three-way catalyst must be consumed.

In other words, the process of the rich spike is divided into two, i.e., a process of desorbing $O_2$ stored in the three-way catalyst and a process of desorbing and cleaning the NOx stored in the lean NOx catalyst. As described later in detail, the inventors have conducted experiments on the rich spike in those two processes from the viewpoints of reducing a fuel consumption and improving the cleaning efficiency of the exhaust emissions, and have found that the optimum air/fuel ratio differs between those two processes. As described later, such finding, i.e., a difference in the optimum air/fuel ratio during the rich spike, depends on characteristics of the three-way catalyst and the lean NOx catalyst.

JP-A-2001-132440 as one example of the prior art discloses a technique of arranging a three-way catalyst in the upstream side, arranging a NOx-occluding and reducing catalyst in the downstream side, and setting a time for holding a stoichiometric state in the three-way catalyst after a rich spike to be not longer than 1 s. This technique focuses attention on an oxygen storing and desorbing characteristic of the upstream three-way catalyst and is intended to reduce NOx by effectively supplying a reductant to the downstream NOx catalyst when an operation mode is changed from rich to lean after the end of the rich spike. Stated another way, the disclosed technique is not intended to provide an optimum air/fuel ratio in each of the process of desorbing the oxygen stored in the three-way catalyst and the process of desorbing and cleaning the NOx stored in the lean NOx catalyst during the rich spike from the viewpoints of both better fuel economy and improved cleaning of the exhaust emissions.

Further, JP-A-2002-70611 discloses a technique of supplying a reductant in larger amount as the amount of oxygen stored in a three-way catalyst and a lean NOx catalyst increases. This technique is intended to optimize the spike time with attention focused on the need of a reductant to consume the stored oxygen. Stated another way, the disclosed technique is not intended to optimize the air/fuel ratio in the process of desorbing the oxygen stored in the three-way catalyst and the air/fuel ratio in the process of desorbing and cleaning the NOx stored in the lean NOx catalyst.

Still further, JP-A-2002-13414 discloses a technique of, in an internal combustion engine including a three-way catalyst and a NOx catalyst, supplying a reductant for desorbing NOx stored in the NOx catalyst and a reductant for cleaning the desorbed NOx in an independently controllable manner. However, this disclosed technique is also not intended to optimize the air/fuel ratio in the process of desorbing the oxygen stored in the three-way catalyst and the air/fuel ratio in the process of desorbing and cleaning the NOx stored in the lean NOx catalyst.

Thus, any of the techniques disclosed in the above-cited laid-open publications is not intended to optimize the air/fuel ratio in the process of desorbing the oxygen stored in the three-way catalyst and the air/fuel ratio in the process of desorbing and cleaning the NOx stored in the lean NOx catalyst from the viewpoints of both improved cleaning of the exhaust emissions and better fuel economy.

The present invention has been made in view of the above-mentioned problems in the art, and its object is to provide an internal combustion engine control device for, in a lean-burn direct-injection internal combustion engine provided with an exhaust emission cleaner including a three-way catalyst and a lean NOx catalyst, optimizing an air/fuel ratio during a rich spike from the viewpoints of both better fuel economy and improved cleaning of exhaust emissions.

DISCLOSURE OF THE INVENTION

To achieve the above object, the present invention provides an internal combustion engine control device for use in a lean-burn internal combustion engine provided with a cleaner including a three-way catalyst and a lean NOx catalyst in an exhaust pipe, wherein the lean NOx catalyst has the function of storing NOx during a lean operation and of desorbing and cleaning the stored NOx by switching to a rich operation, and the control device includes air/fuel ratio changing means, the air/fuel ratio changing means controlling an air/fuel ratio to be changed during the rich operation, thereby cleaning the NOx having been stored in the lean NOx catalyst during the lean operation (see FIG. 1).

With the thus-constructed internal combustion engine control device of the present invention, by controlling the air/fuel ratio during the rich operation to be changed for optimization, it is possible to ensure air/fuel ratio control for the internal combustion engine that is optimized for desorbing and cleaning the NOx, which has been stored in the lean NOx catalyst during the lean operation, by switching to the rich operation from the viewpoints of reducing fuel consumption and increasing the cleaning performance of exhaust emissions. Accordingly, a lower fuel consumption and higher cleaning performance of exhaust emissions can be realized as compared with the related art.

The functions of the internal combustion engine control device of the present invention, which are effective in reducing the fuel consumption and increasing the cleaning performance of exhaust emissions, will be understood from experimental results shown in FIGS. 16 through 23 and the following description.

FIGS. 16 and 17 show respectively experimental results of cleaning efficiencies of HC and CO (three-way catalyst) and cleaning efficiencies of CO HC, CO and stored NOx (NOx catalyst), which are introduced through inlets of the three-way catalyst and the lean NOx catalyst, with respect to a rich time after the lean operation has been performed for a predetermined time. In either case, a rich depth is set to 20%.

The term "rich depth" means a rate at which the fuel amount is increased from a value corresponding to the stoichiometric air/fuel ratio. As seen from FIG. 16 showing the case of the three-way catalyst, the cleaning efficiencies of CO and HC are reduced when the rich time exceeds 1 second. This 1-second is assumed to be a period during which $O_2$ stored in the three-way catalyst is desorbed and CO, HC are oxidized. In other words, unless the rich operation is continued for 1 second or longer, HC and CO serving as a reductant cannot be supplied to the lean NOx catalyst in the downstream side. It can therefore be said that an optimum rich spike time for the three-way catalyst is given as a period during which the stored $O_2$ oxidizes HC and CO introduced through the catalyst inlet.

On the other hand, as seen from FIG. 17 showing the case of the lean NOx catalyst, the stored NOx can be hardly cleaned when the rich time is not longer than about 7 seconds. When the rich time exceeds 7 seconds, the cleaning efficiency of NOx is about 100%, but the cleaning efficiency of CO is reduced. This means that the NOx stored in the lean NOx catalyst is desorbed and only CO is oxidized, whereas HC hardly contributes to cleaning of the stored NOx. It can therefore be said that an optimum rich spike time for the lean NOx catalyst is given as a period during which the stored NOx oxidizes CO introduced through the catalyst inlet.

While the above-mentioned experimental results are obtained at the rich depth of 20%, FIG. 18 shows the cleaning efficiency of NOx and the cleaning efficiency of CO at an optimum time with respect to various values of the rich depth.

As shown in FIG. 18, as the rich depth increases, the optimum time of the rich operation is shortened for both the three-way catalyst and the lean NOx catalyst. Also, the cleaning efficiencies of HC, CO and NOx with respect to the rich depth are not dependent on the rich depth. More specifically, the cleaning efficiencies of CO and NOx are constantly high, while the cleaning efficiency of HC is constantly low. It can therefore be said that the stored NOx and CO can be cleaned with high efficiency by optimizing the rich time.

FIGS. 19 through 22 show respective cleaning efficiencies of HC and respective fuel amounts required during the rich spike in the three-way catalyst and the NOx catalyst with respect to the rich depth. Note that the rich time is optimized in accordance with the above-described method.

In the case of the three-way catalyst, as seen from FIGS. 19 and 20, the cleaning efficiency of HC is not dependent on the rich depth, and the required fuel amount is reduced as the rich depth increases. It can therefore be said that an optimum rich spike depth for the three-way catalyst is preferably as large as possible.

On the other hand, in the case of the NOx catalyst, as seen from FIGS. 21 and 22, the cleaning efficiency of HC is generally low and is further reduced as the rich depth increases. Also, as the rich depth increases, the amount of HC at the inlet of the NOx catalyst is increased and so is the amount of HC discharged at the catalyst outlet. In addition, the required fuel amount is reduced as the rich depth increases. Accordingly, an optimum rich spike depth for the NOx catalyst is required to be set smaller from the viewpoint of HC cleaning performance and to be set larger from the viewpoint of fuel economy.

The foregoing can be summarized as shown in FIG. 23. The optimum rich spike time is given for the three-way catalyst as a period during which the stored $O_2$ oxidizes HC and CO, and it is given for the NOx catalyst as a period during which the stored NOx oxidizes CO. By thus optimizing the optimum rich spike time, CO and NOx can be minimized.

Then, the optimum rich spike depth is preferably as large as possible for the three-way catalyst from the viewpoints of reducing both HC and the fuel consumption. The optimum rich spike depth for the NOx catalyst has opposite characteristics in points of reducing HC and the fuel consumption. Considering a tradeoff between those opposite characteristics, therefore, the rich spike depth is increased to a limit within an allowable range of the HC amount. By so optimizing the optimum rich spike depth, HC and the fuel consumption can be minimized. Thus, from the viewpoints of both improved cleaning of exhaust emissions and better fuel economy, optimum rich spike control (air/fuel ratio control) can be obtained by setting the rich spike depth to be not constant, i.e., as control of changing the rich spike depth (rate at which the fuel amount is increased from a value corresponding to the stoichiometric air/fuel ratio) during each of the optimum time for desorbing the $O_2$ stored in the three-way catalyst and the optimum time for desorbing and cleaning the NOx stored in the NOx catalyst without holding the rich spike depth constant during both of those optimum times.

In a specific form of the internal combustion engine control device according to the present invention, the air/fuel ratio changing means controls the air/fuel ratio to be changed to a plurality of predetermined air/fuel ratios during the rich operation (see FIG. 2).

In another specific form of the internal combustion engine control device according to the present invention, the air/fuel ratio changing means controls the air/fuel ratio to be changed to different air/fuel ratios between the first half and the second half during the rich operation (see FIG. 3).

With that feature, an optimum air/fuel ratio can be provided for each of the time for desorbing the $O_2$ stored in the three-way catalyst and the time for desorbing and cleaning the NOx stored in the NOx catalyst.

In still another specific form of the internal combustion engine control device according to the present invention, the three-way catalyst is disposed in the upstream side of the exhaust pipe, the lean NOx catalyst is disposed in the downstream side of the exhaust pipe, and the control device controls the air/fuel ratio in the first half during the rich operation to be richer than the air/fuel ratio in the second half during the rich operation (see FIG. 4).

With that feature, an optimum air/fuel ratio can be provided by controlling the air/fuel ratio during the time for desorbing the $O_2$ stored in the three-way catalyst to be richer than the air/fuel ratio during the time for desorbing and cleaning the NOx stored in the NOx catalyst.

In still another specific form of the internal combustion engine control device according to the present invention, the lean NOx catalyst is disposed in the upstream side of the exhaust pipe, the three-way catalyst is disposed in the downstream side of the exhaust pipe, and the control device controls the air/fuel ratio in the first half during the rich operation to be leaner than the air/fuel ratio in the second half during the rich operation (see FIG. 5).

Instead of the aforementioned feature of controlling the air/fuel ratio during the time for desorbing the $O_2$ stored in the three-way catalyst to be richer than the air/fuel ratio during the time for desorbing and cleaning the NOx stored in the NOx catalyst, the just above feature can provide an optimum air/fuel ratio by controlling the air/fuel ratio in the first half (lean NOx catalyst) during the rich operation to be leaner than that in the second half (three-way catalyst) during the rich operation because the lean NOx catalyst is disposed upstream of the three-way catalyst.

In still another specific form of the internal combustion engine control device according to the present invention, the air/fuel ratio changing means controls the air/fuel ratio to be changed between a period in which $O_2$ stored in the three-way catalyst is desorbed during the rich operation and a period in which NOx stored in the lean NOx catalyst is desorbed and cleaned during the rich operation (see FIG. 6).

In still another specific form of the internal combustion engine control device according to the present invention, the control device includes means for directly or indirectly estimating an amount of $O_2$ stored in the three-way catalyst, and when the amount of the stored $O_2$ has become equal to or less than a predetermined value during the rich operation, the control device determines that the period of desorbing the $O_2$ stored in the three-way catalyst is completed, and controls the air/fuel ratio changing means for change of the air/fuel ratio (see FIG. 7).

In still another specific form of the internal combustion engine control device according to the present invention, the control device includes means for directly or indirectly estimating an amount of NOx stored in the lean NOx catalyst, and when the amount of the stored NOx has become equal to or less than a predetermined value during the rich operation, the control device determines that the period of desorbing and cleaning the NOx stored in the lean NOx catalyst is completed, and controls the air/fuel ratio changing means for change of the air/fuel ratio (see FIG. 8).

According to another aspect, the present invention provides an internal combustion engine control device for use in a lean-burn internal combustion engine provided with a cleaner including a three-way catalyst disposed in the upstream side of an exhaust pipe and a lean NOx catalyst in the downstream side of the exhaust pipe, wherein the control device comprises means for directly or indirectly estimating an amount of $O_2$ stored in the three-way catalyst and means for directly or indirectly estimating an amount of NOx stored in the lean NOx catalyst; means for computing a target air/fuel ratio during a lean operation (lean-mode target air/fuel ratio), a target air/fuel ratio in a period of desorbing $O_2$ in the three-way catalyst during a rich operation (rich-mode first target air/fuel ratio), and a target air/fuel ratio in a period of desorbing and cleaning NOx adsorbed in the lean NOx catalyst during the rich operation (rich-mode second target air/fuel ratio); and means for changing the target air/fuel ratio to the rich-mode first target air/fuel ratio when an amount of the stored NOx has become equal to or more than a predetermined value 1 during the lean operation, to the rich-mode second target air/fuel ratio when an amount of the stored $O_2$ has become equal to or less than a predetermined value 2 during the rich operation, and to the lean-mode target air/fuel ratio when the amount of the stored NOx has become equal to or less than a predetermined value 3 during the rich operation (see FIG. 9).

With that feature, the operation mode is switched over from the lean operation to the rich operation on condition that the amount of NOx stored in the lean NOx catalyst has become equal to or more than the predetermined value, and is returned to the lean operation again when the desorption and cleaning of the stored NOx are completed. Therefore, an internal combustion engine control device can be provided which is optimized from the viewpoints of both better fuel economy and improved cleaning of the exhaust emissions when the NOx having been stored in the lean NOx catalyst during the lean operation is desorbed and cleaned by switching to the rich operation.

In still another specific form of the internal combustion engine control device according to the present invention, the control device further comprises $O_2$-concentration detecting means downstream of the three-way catalyst, and when an output of the $O_2$-concentration detecting means has become equal to or more than a predetermined value after start of the rich operation, the control device determines that the amount of $O_2$ stored in the three-way catalyst is not more than a predetermined value, and the air/fuel ratio changing means controls the air/fuel ratio to be changed (see FIG. 10).

That feature is based on a phenomenon that an $O_2$ sensor downstream of the three-way catalyst produces an output indicating a rich reversal when the desorption of $O_2$ stored in the three-way catalyst is completed after the mode switching from the lean operation to the rich operation.

In still another specific form of the internal combustion engine control device according to the present invention, the control device further comprises $O_2$-concentration detecting means or NOx-concentration detecting means downstream of the lean NOx catalyst, and when an output of the $O_2$-concentration detecting means or the NOx-concentration detecting means downstream of the lean NOx catalyst has become equal to or more than a predetermined value after start of the rich operation, the control device determines that the amount of NOx stored in the lean NOx catalyst is not more than a predetermined value, and the air/fuel ratio changing means controls the air/fuel ratio to be changed (see FIG. 11).

That feature is based on a phenomenon that an $O_2$ sensor NOx-concentration detecting means downstream of the NOx catalyst produces an output indicating a rich reversal when the desorption and cleaning of NOx stored in the NOx catalyst are completed after the mode switching from the lean operation to the rich operation.

In still another specific form of the internal combustion engine control device according to the present invention, the control device further comprises means for computing a fuel amount required for desorbing the stored $O_2$ based on the amount of $O_2$ stored in the three-way catalyst, means for directly or indirectly computing an actual fuel injection amount, and means for making subtraction from the fuel amount required for desorbing the stored $O_2$ based on the actual fuel injection amount during the rich operation, and when the fuel amount required for desorbing the stored $O_2$ has become equal to or less than a predetermined value, the control device determines that the amount of $O_2$ stored in the three-way catalyst is not more than a predetermined value, and the air/fuel ratio changing means controls the air/fuel ratio to be changed (see FIG. 12).

In still another specific form of the internal combustion engine control device according to the present invention, the control device further comprises means for computing a fuel amount required for desorbing and cleaning the stored NOx based on the amount of NOx stored in the lean NOx catalyst, means for directly or indirectly computing an actual fuel injection amount, and means for making subtraction from the fuel amount required for desorbing the stored NOx based on the actual fuel injection amount, and when the fuel amount required for desorbing and cleaning the stored NOx has become equal to or less than a predetermined value, the control device determines that the amount of NOx stored in the lean NOx catalyst is not more than a predetermined value, and the air/fuel ratio changing means controls the air/fuel ratio to be changed (see FIG. 13).

With that feature, the internal combustion engine control device according to the present invention can provide air/fuel ratio control for the internal combustion engine, which is optimized from the viewpoints of both better fuel economy and improved cleaning of the exhaust emissions by deciding the fuel amount required for desorbing and cleaning the NOx stored in the lean NOx catalyst based on the amount of the stored NOx and the rich depth.

FIGS. 24 and 25 show the required fuel amounts for the three-way catalyst and the lean NOx catalyst, respectively, on condition that the rich spike time is optimized. In general, because the $O_2$ concentration during the lean operation is high, the amount of $O_2$ stored in the three-way catalyst is saturated in a short time. Within a practical range, therefore, the amount of the stored $O_2$ can be assumed to be constant, and the required fuel amount can be decided from only the rich depth. On the other hand, because the NOx concentration during the lean operation is low, the amount of NOx stored in the NOx catalyst is hardly saturated within a practical range. Therefore, the fuel amount required for desorbing and cleaning the NOx stored in the NOx catalyst can be decided from the amount of the stored NOx and the rich depth.

In still another specific form of the internal combustion engine control device according to the present invention, the control device further comprises means for directly or indirectly detecting engine operation parameters including an engine revolution speed, an engine torque, an air/fuel ratio, an exhaust temperature, and an intake air amount; and a three-way catalyst model for computing the amount of $O_2$ stored in the three-way catalyst from the engine operation parameters (see FIG. 14).

In still another specific form of the internal combustion engine control device according to the present invention, the control device further comprises means for directly or indirectly detecting engine operation parameters including an engine revolution speed, an engine torque, an air/fuel ratio, an exhaust temperature, an intake air amount, an EGR rate, and an amount of NOx discharged from the internal combustion engine; and a lean NOx catalyst model for computing the amount of NOx stored in the lean NOx catalyst from the engine operation parameters (see FIG. 15).

BRIEF DESCRIPTION OF THE DRAWINGS

FIG. 4 is a block diagram of an internal combustion engine control device set forth in claim 4.

FIG. 5 is a block diagram of an internal combustion engine control device set forth in claim 5.

FIG. 23 is a table showing an optimum rich spike time and an optimum rich spike depth together.

FIG. 24 is a graph showing a fuel amount required for consuming (desorbing) $O_2$ stored in the three-way catalyst with respect to a rich depth.

FIG. 25 is a graph showing, with respect to an amount of NOx stored in the lean NOx catalyst and to a rich depth, a fuel amount required for cleaning the stored NOx.

BEST MODE FOR CARRYING OUT THE INVENTION

Several embodiments of an internal combustion engine control device according to the present invention will be described in detail below with reference to the drawings.

FIRST EMBODIMENT

Figure 1:
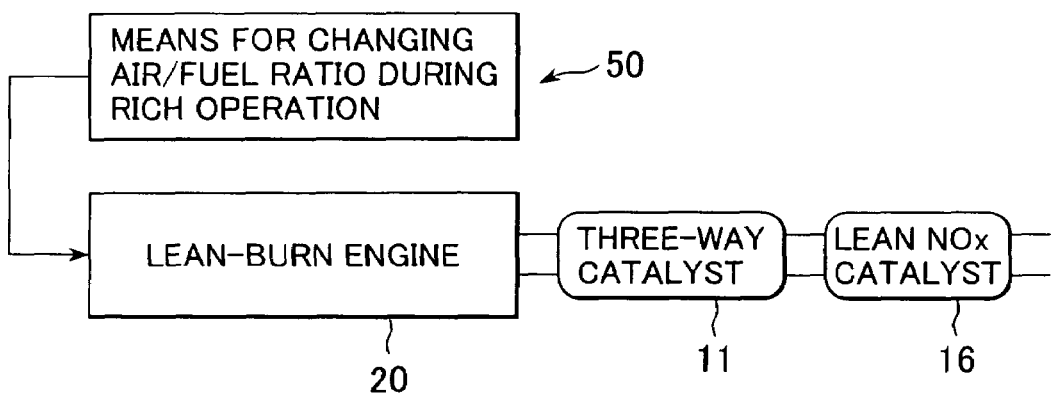
FIG. 1 is a block diagram of an internal combustion engine control device set forth in claim 1.
Figure 2:
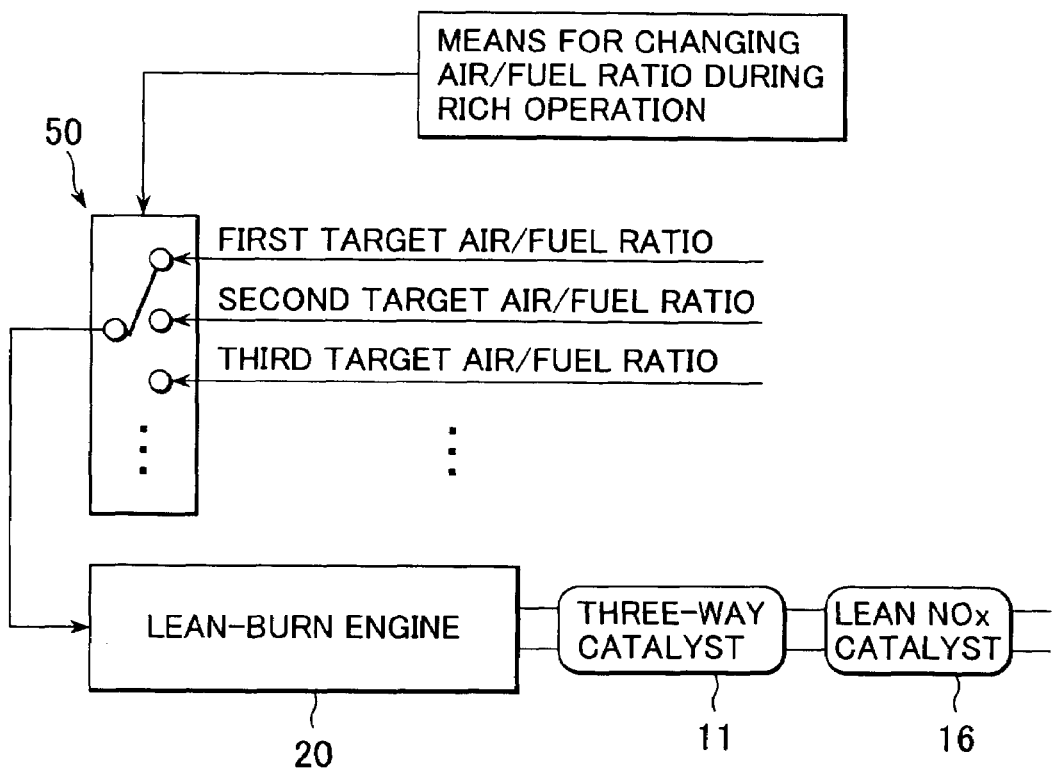
FIG. 2 is a block diagram of an internal combustion engine control device set forth in claim 2.
Figure 3:
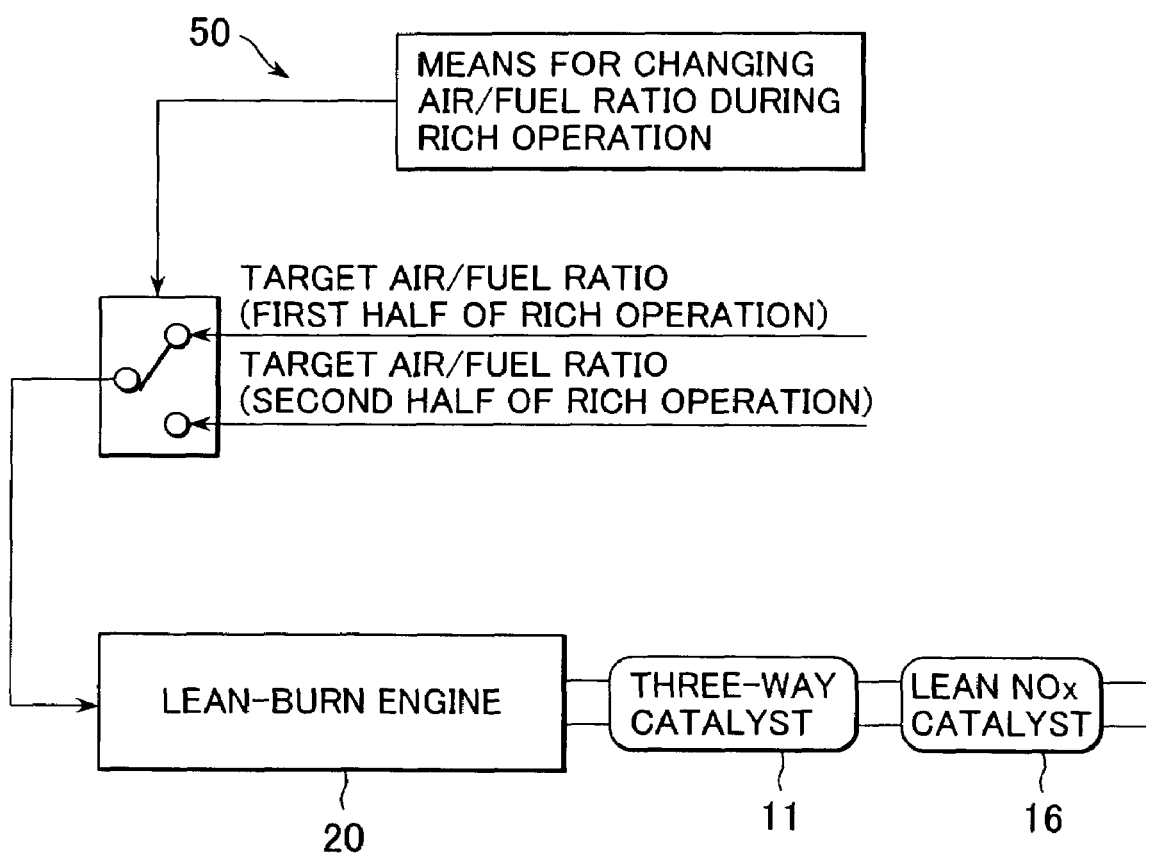
FIG. 3 is a block diagram of an internal combustion engine control device set forth in claim 3.
Figure 6:
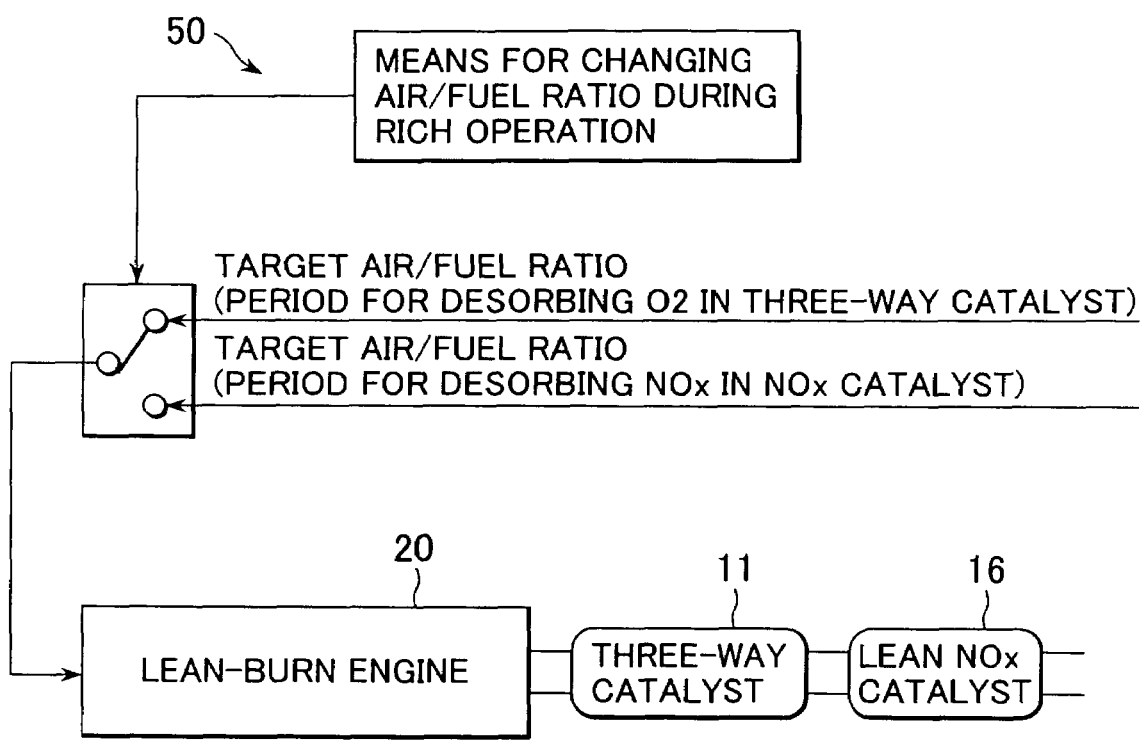
FIG. 6 is a block diagram of an internal combustion engine control device set forth in claim 6.
Figure 7:
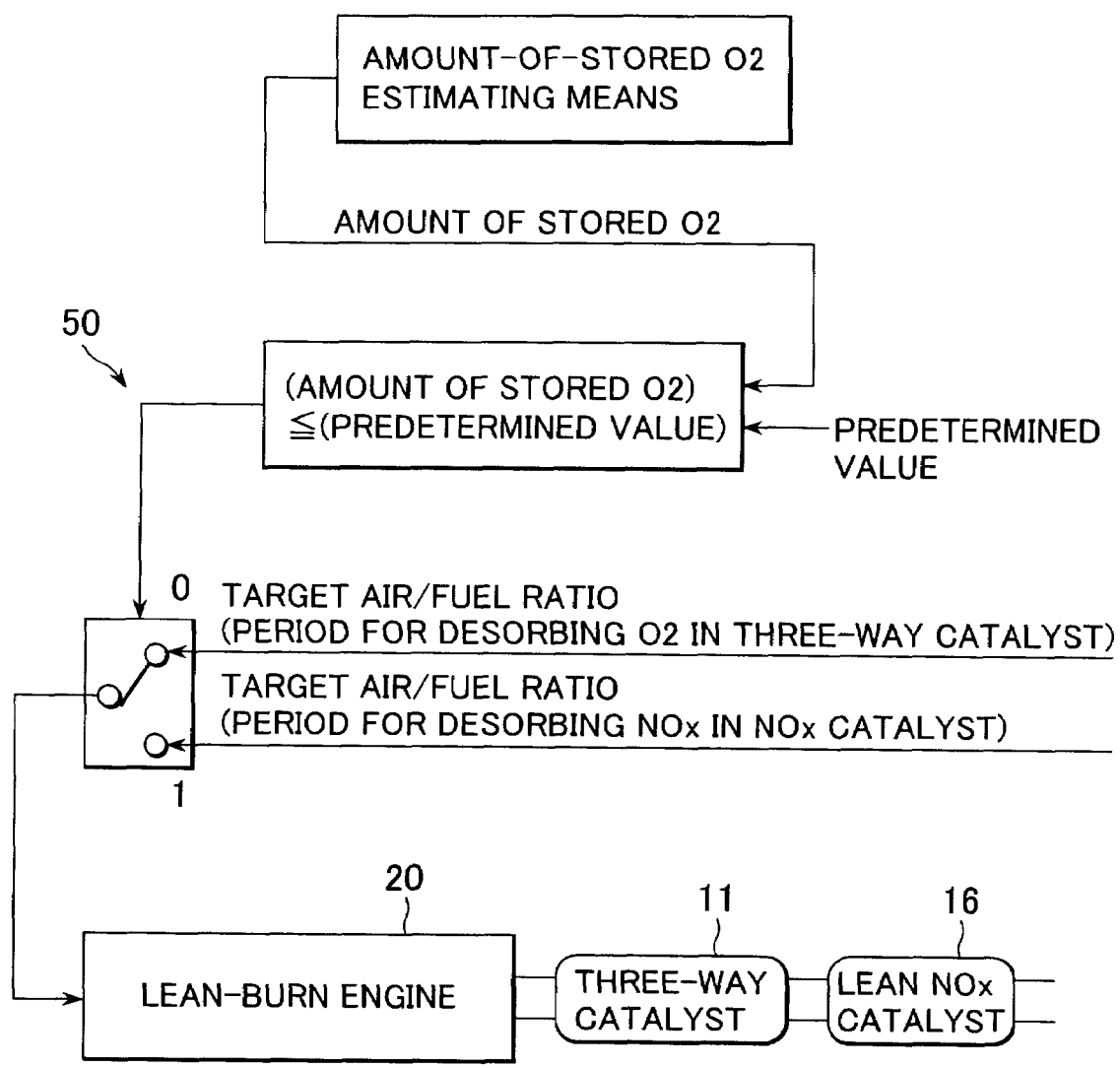
FIG. 7 is a block diagram of an internal combustion engine control device set forth in claim 7.
Figure 8:
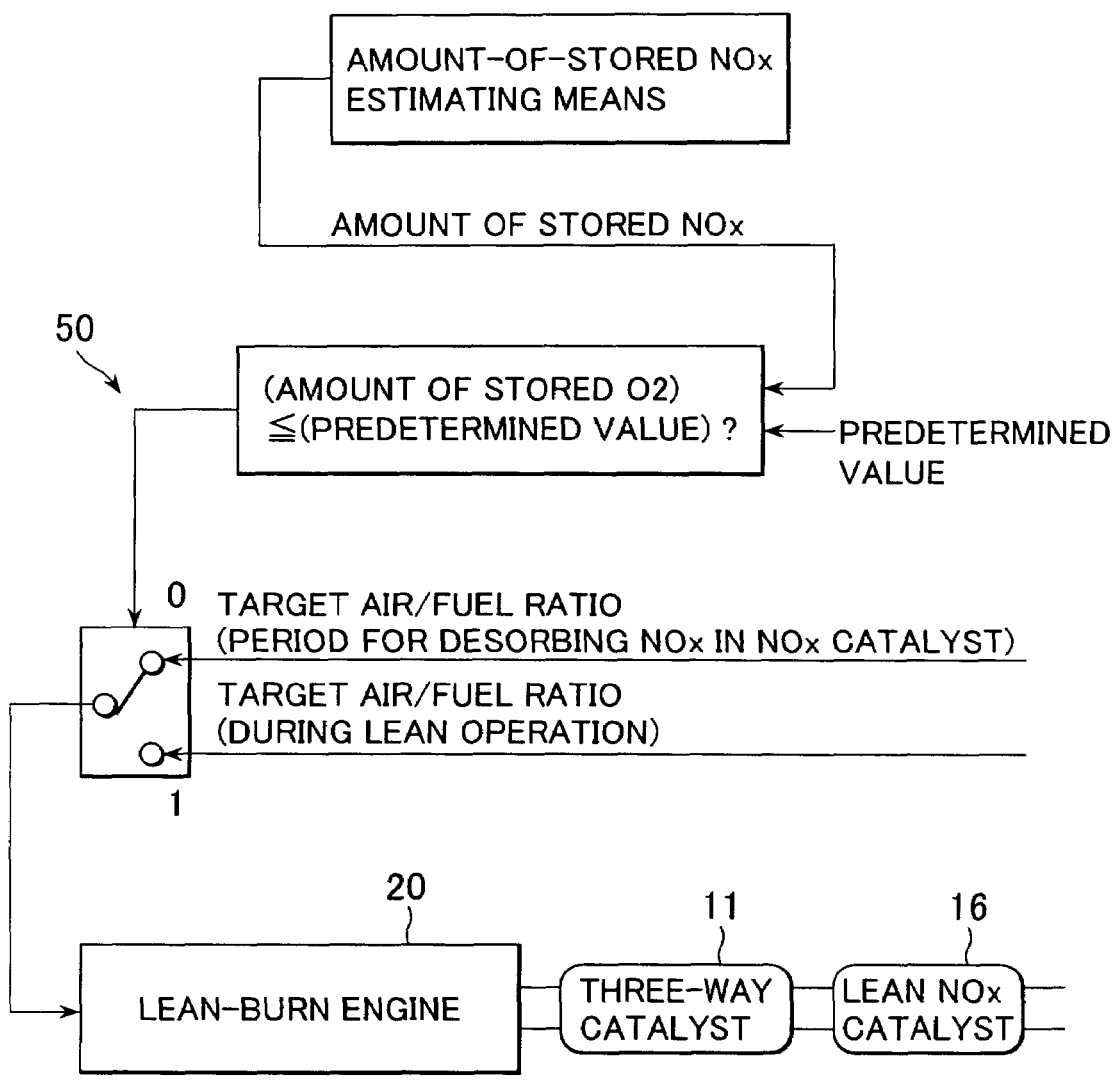
FIG. 8 is a block diagram of an internal combustion engine control device set forth in claim 8.
Figure 9:
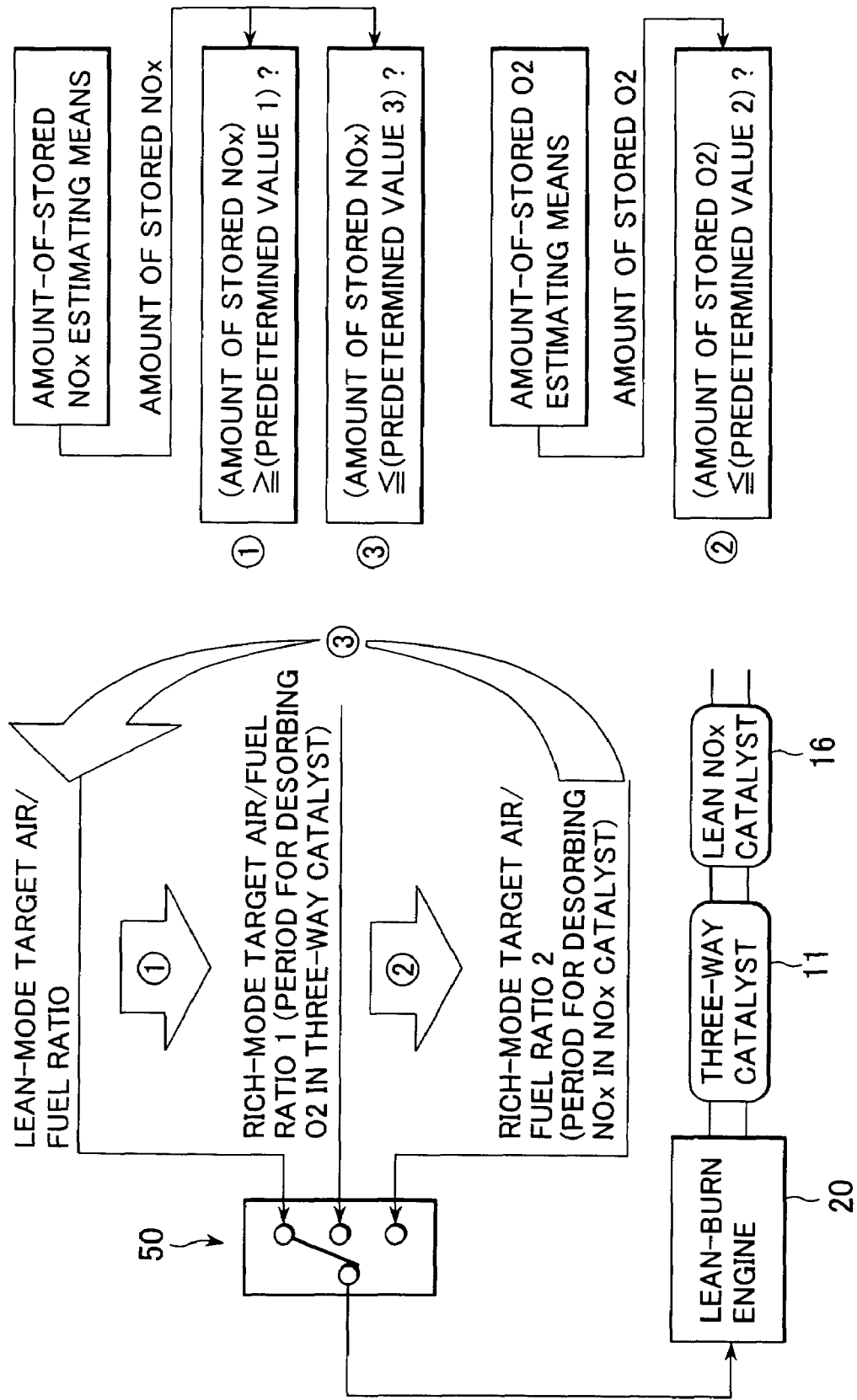
FIG. 9 is a block diagram of an internal combustion engine control device set forth in claim 9.
Figure 10:
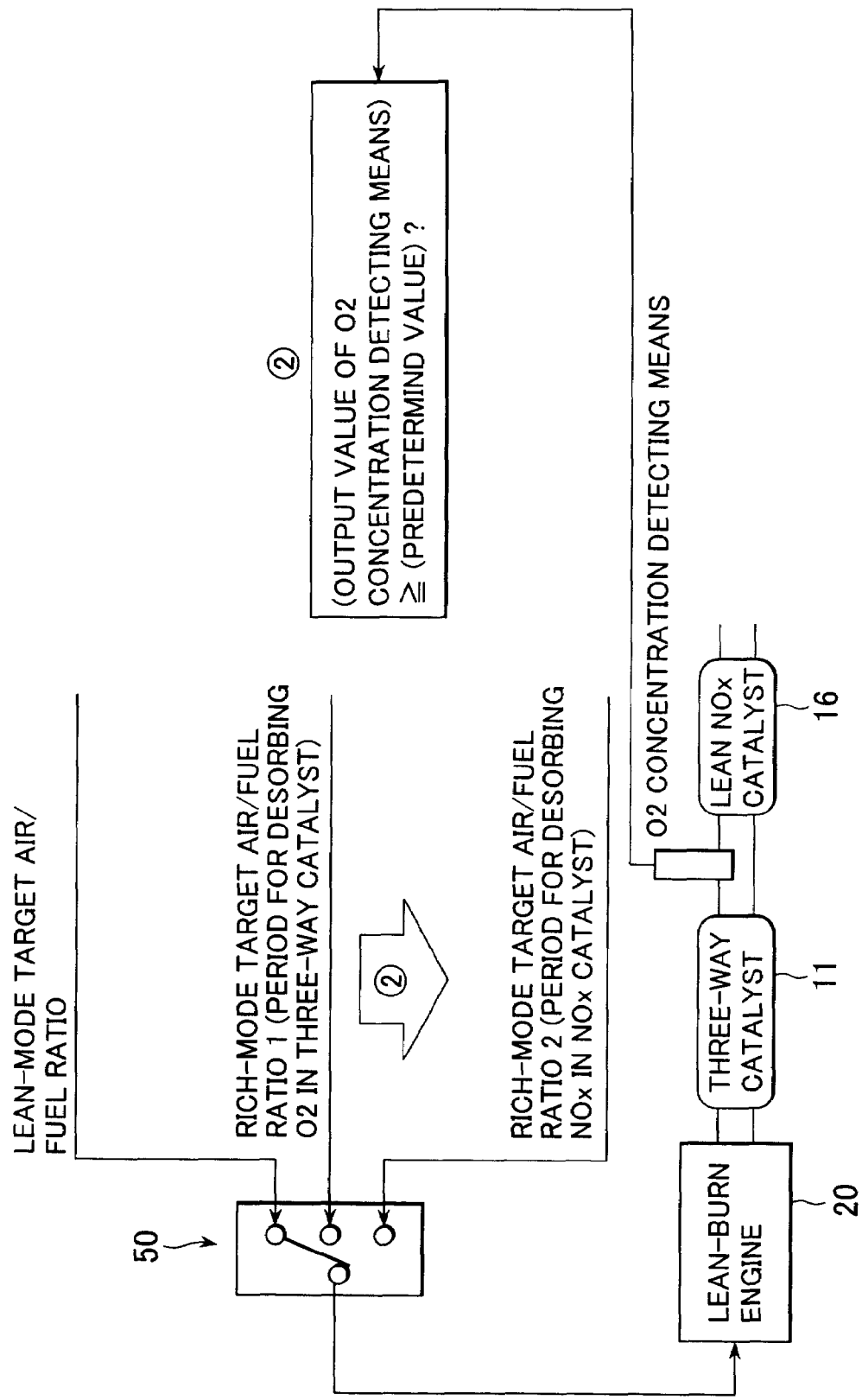
FIG. 10 is a block diagram of an internal combustion engine control device set forth in claim 10.
Figure 11:
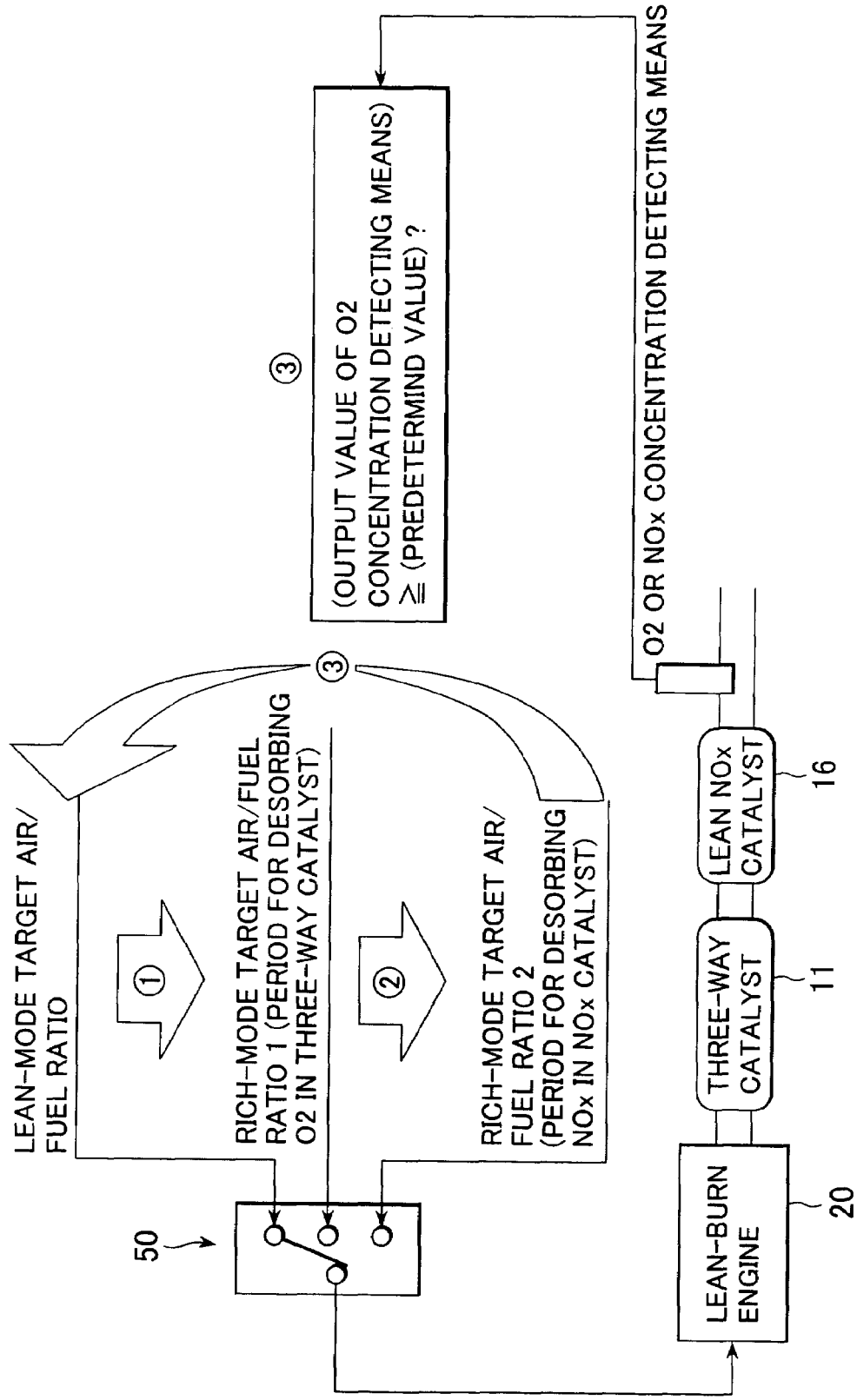
FIG. 11 is a block diagram of an internal combustion engine control device set forth in claim 11.
Figure 12:
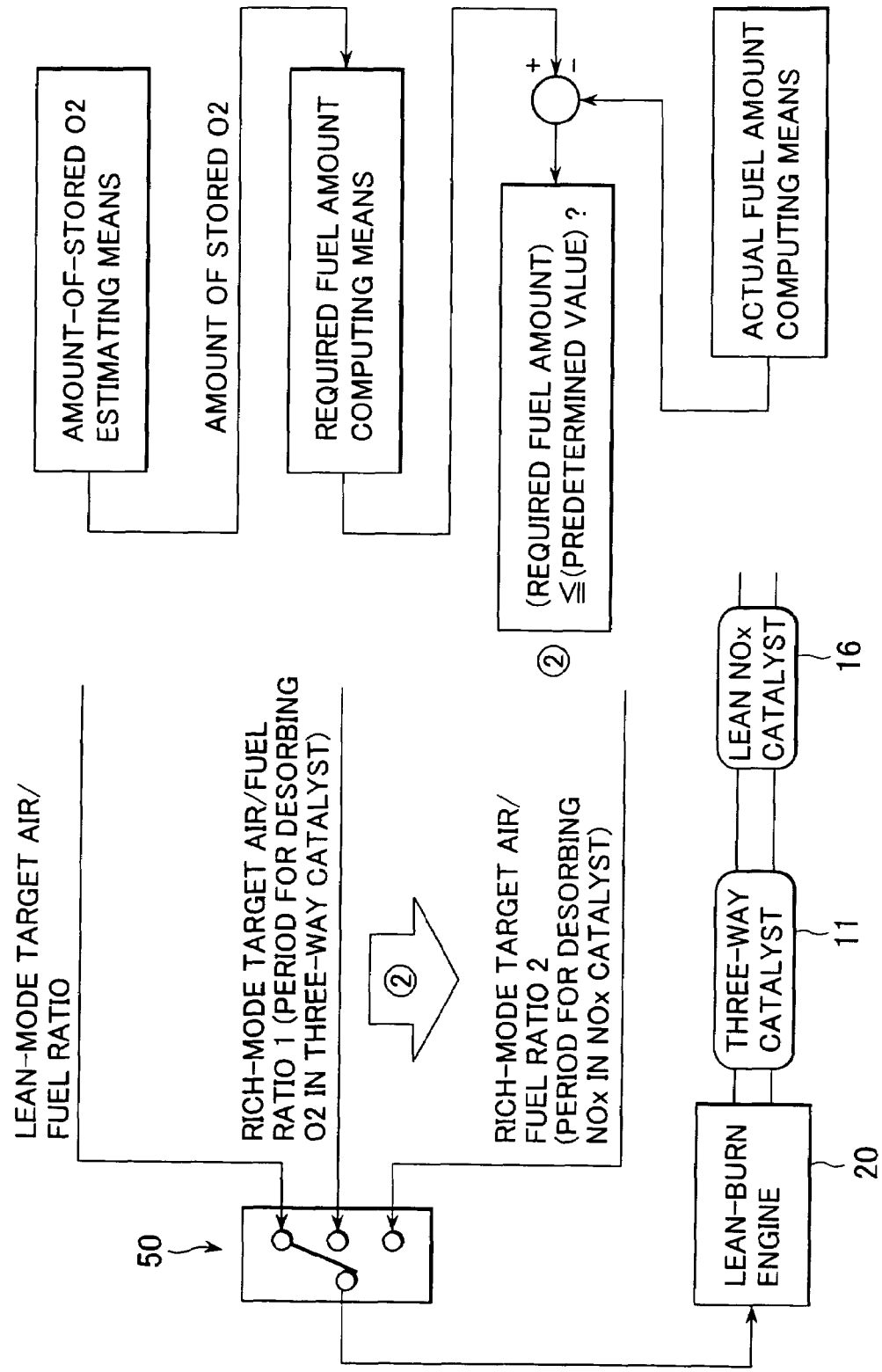
FIG. 12 is a block diagram of an internal combustion engine control device set forth in claim 12.
Figure 13:
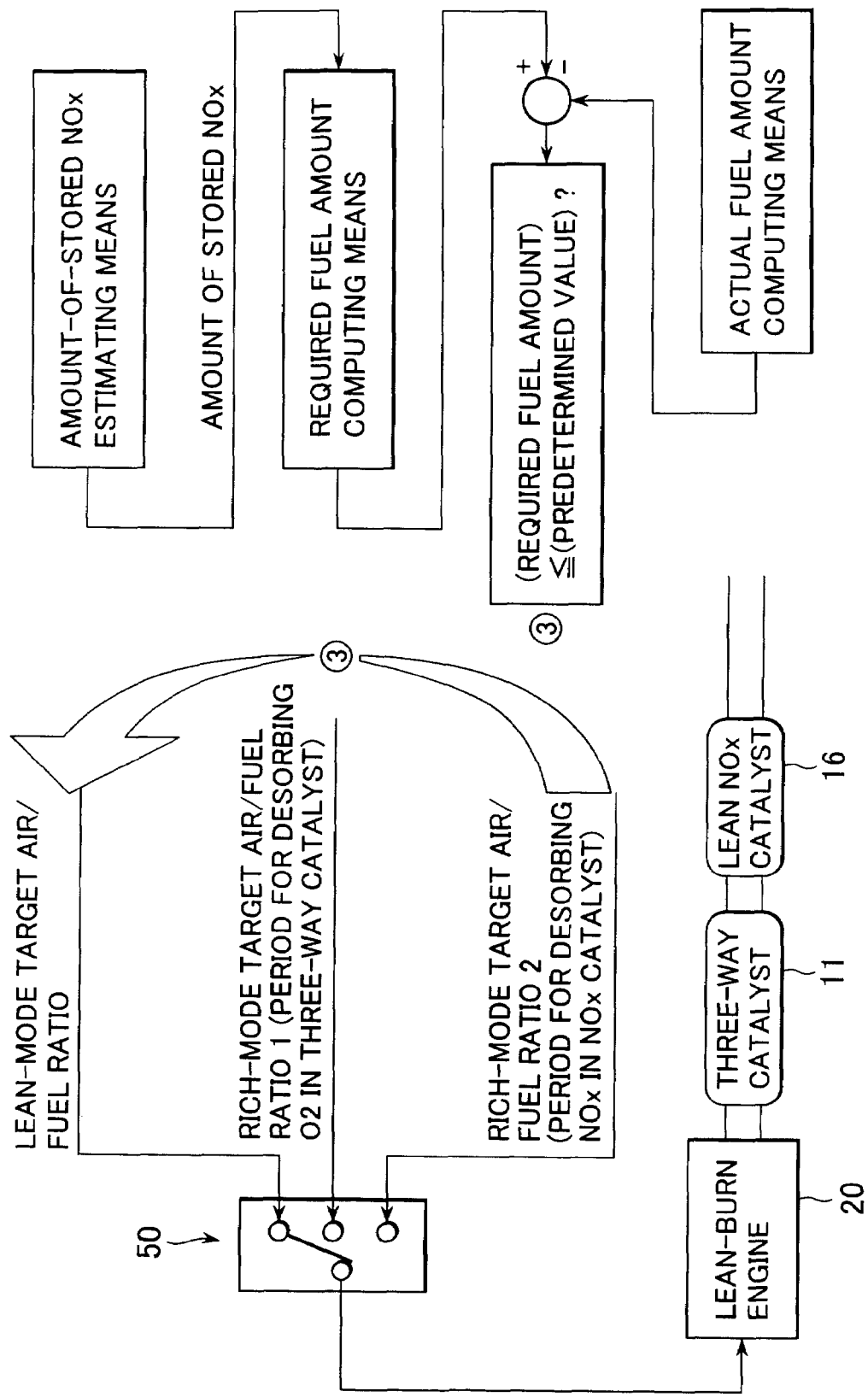
FIG. 13 is a block diagram of an internal combustion engine control device set forth in claim 13.
Figure 14:
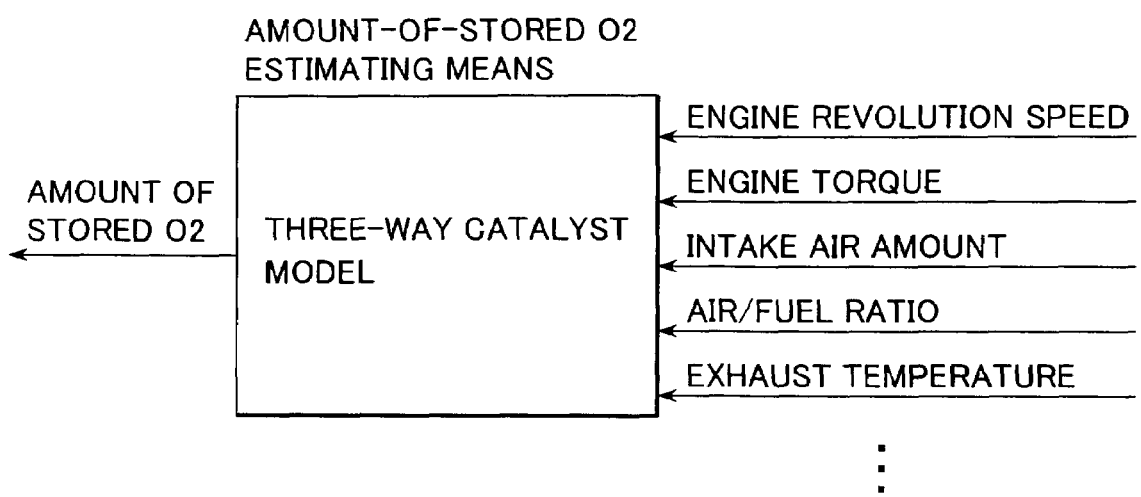
FIG. 14 is a block diagram of an internal combustion engine control device set forth in claim 14.
Figure 15:
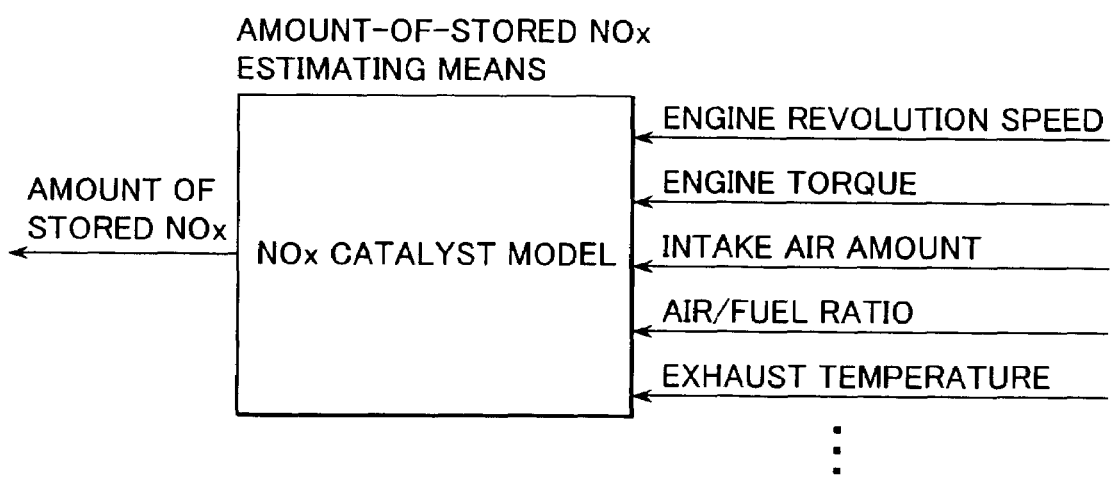
FIG. 15 is a block diagram of an internal combustion engine control device set forth in claim 15.
Figure 16:
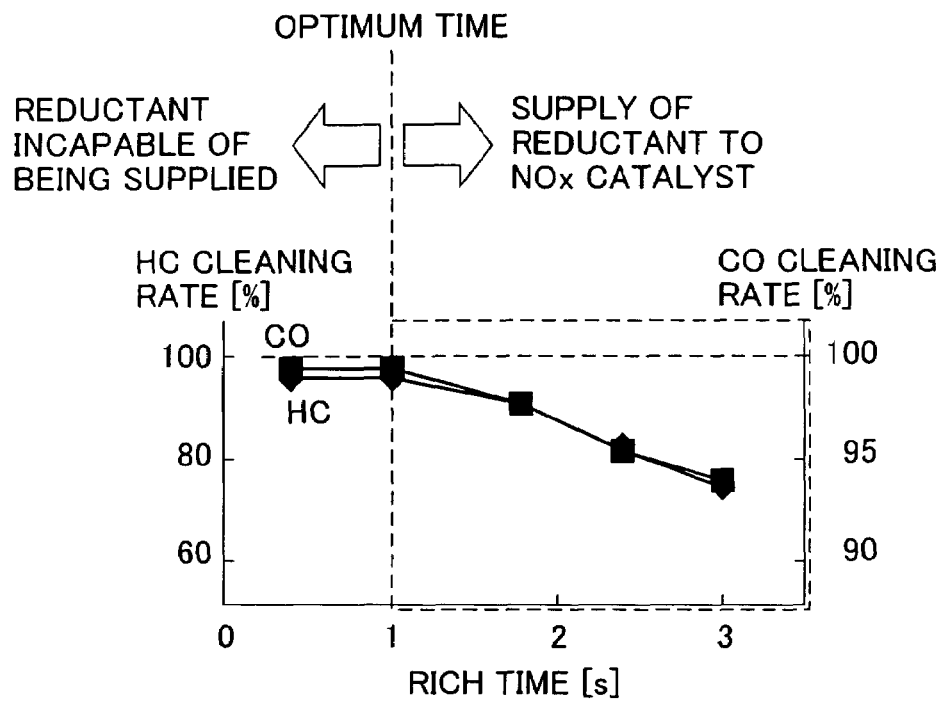
FIG. 16 is a graph showing cleaning efficiencies of HC and CO in a three-way catalyst with respect to a rich time.
Figure 17:
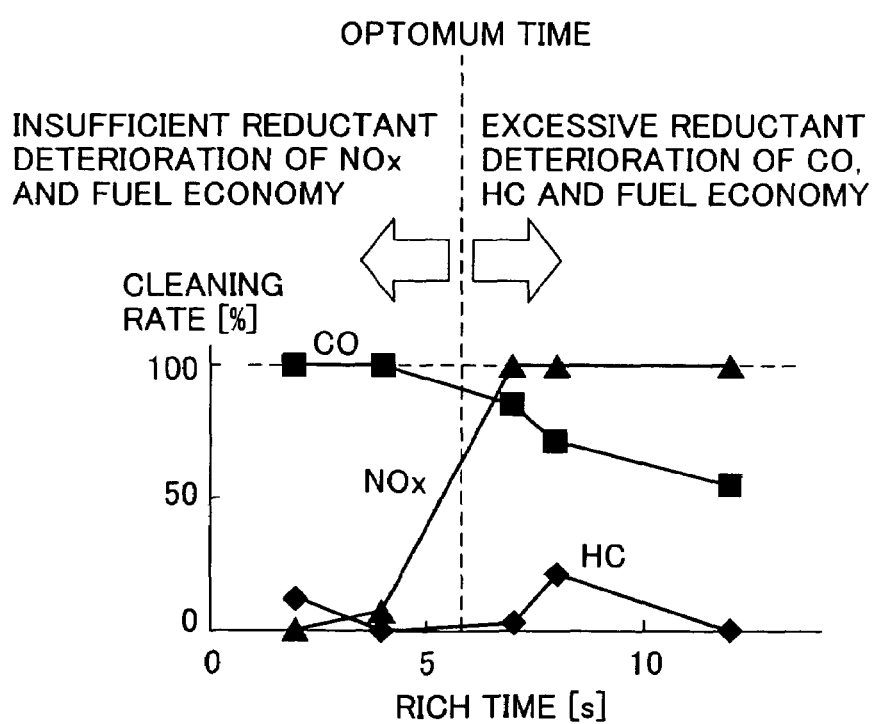
FIG. 17 is a graph showing cleaning efficiencies of HC, CO and NOx in a lean NOx catalyst with respect to a rich time.
Figure 18:
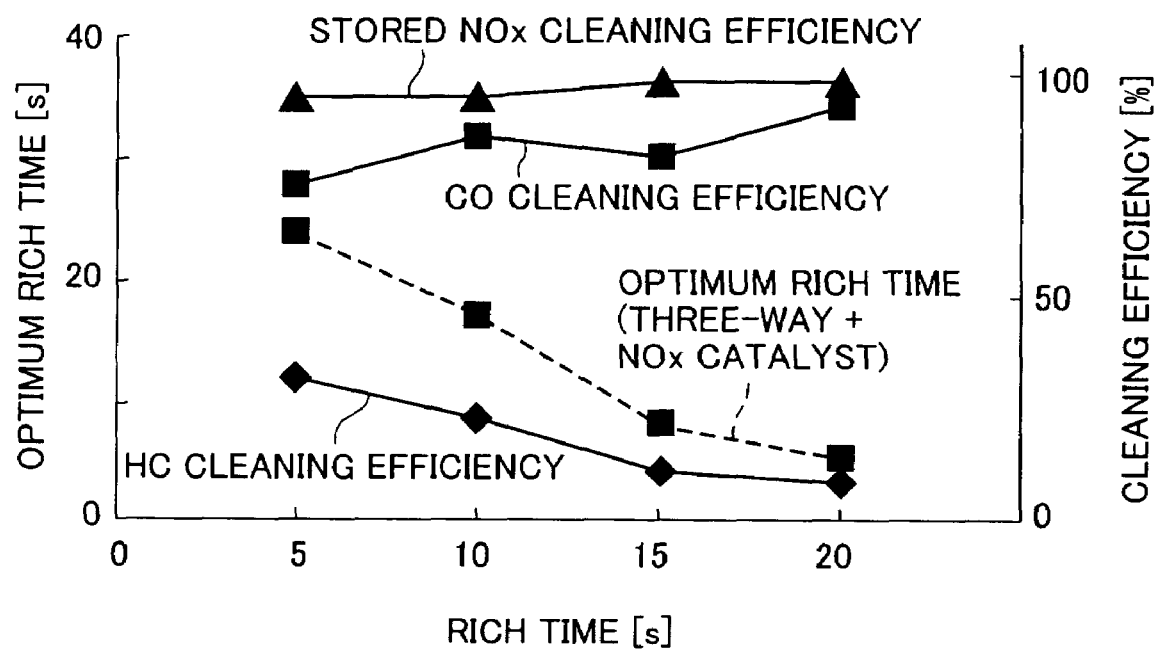
FIG. 18 is a graph showing an optimum rich time and cleaning efficiencies of HC, CO and NOx in the lean NOx catalyst with respect to a rich depth.
Figure 19:
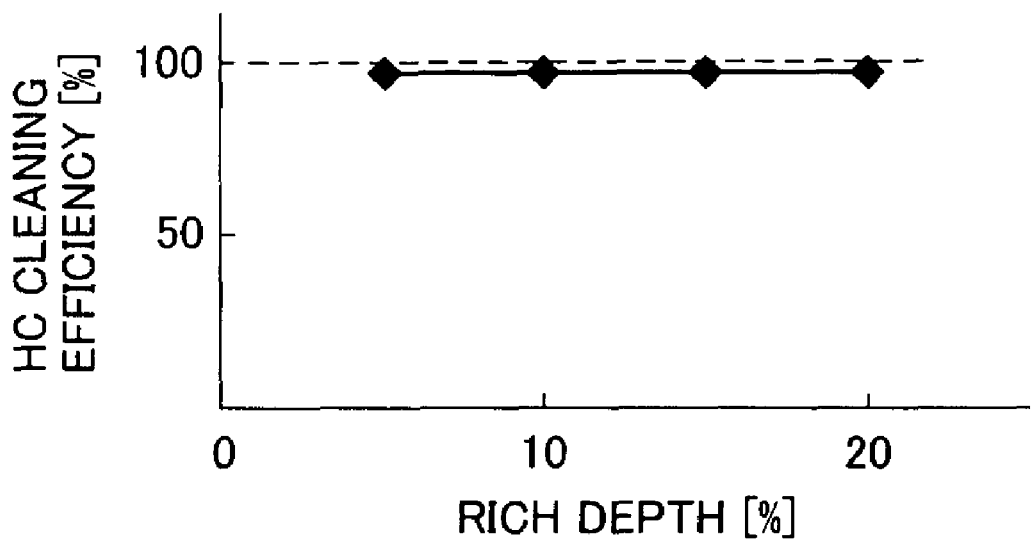
FIG. 19 is a graph showing cleaning efficiency of HC in the three-way catalyst with respect to a rich depth.
Figure 20:
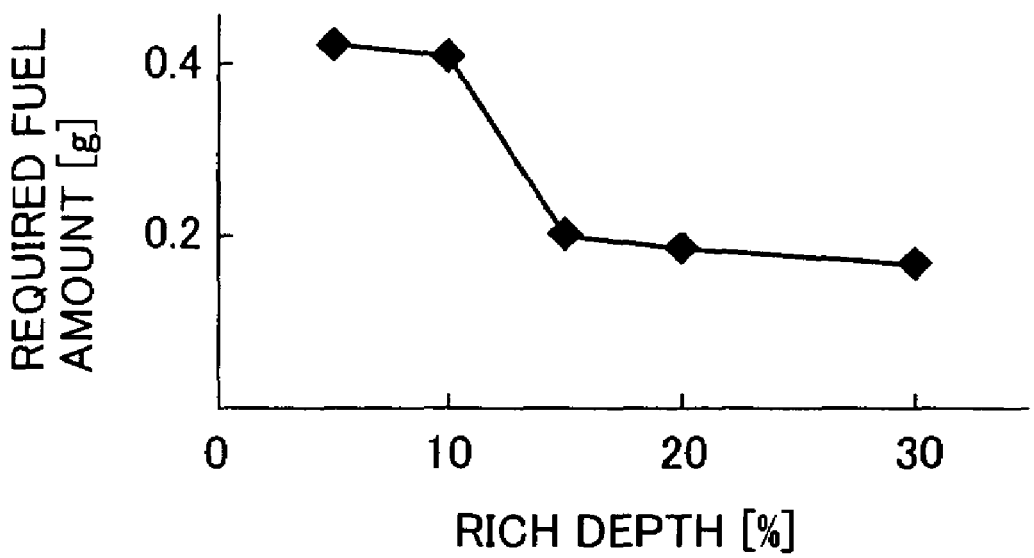
FIG. 20 is a graph showing a fuel consumption in the three-way catalyst with respect to a rich depth.
Figure 21:
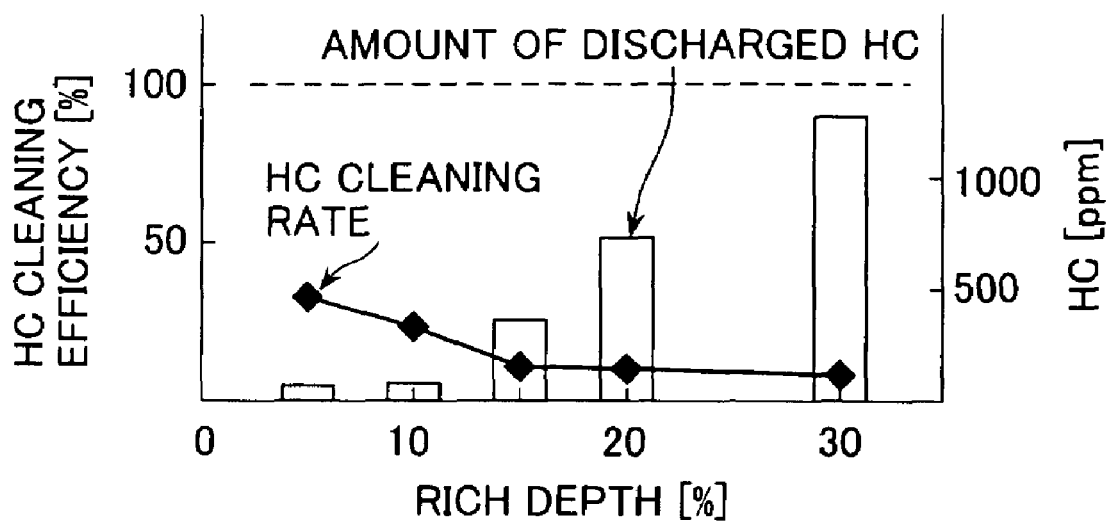
FIG. 21 is a graph showing cleaning efficiency of HC in the lean NOx catalyst with respect to a rich depth and an amount of discharged HC downstream of the lean NOx catalyst.
Figure 22:
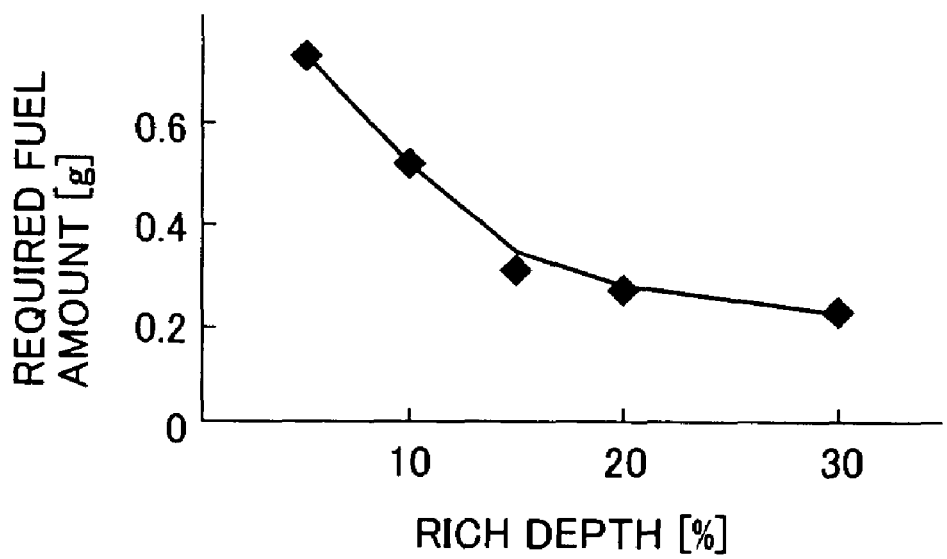
FIG. 22 is a graph showing a required fuel amount in the lean NOx catalyst with respect to a rich depth.
Figure 26:
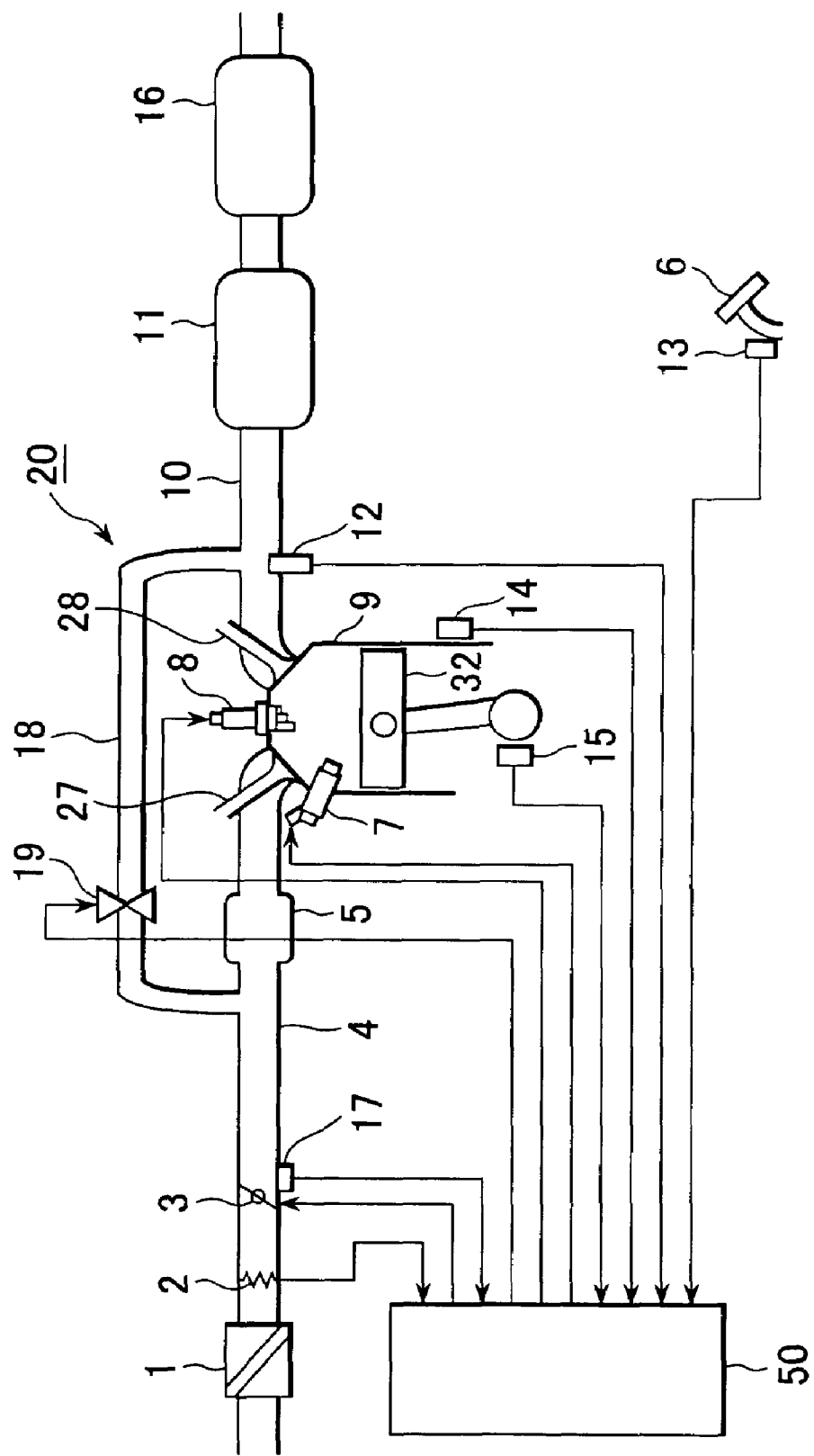
FIG. 26 is a schematic view of an overall control system in a first embodiment of the internal combustion engine control device according to the present invention.

FIG. 26 shows an overall system of an internal combustion engine in a first embodiment to which an internal combustion engine control device of the present invention is applied.

An internal combustion engine 20 is constituted as a multi-cylinder direct-injection internal combustion engine. An intake system is constructed such that air taken in from the outside passes through an air cleaner 1 and flows into each cylinder 9 after passing through an intake manifold 4 and a collector 5. An amount of the intake air is adjusted by an electronic throttle valve 3.

An ignition plug 8 and a fuel injection valve 7 are mounted to each cylinder 9, while each cylinder 9 is provided with an intake valve 27 and an exhaust valve 28. Also, in an exhaust system, an exhaust manifold 10 is connected to each cylinder 9. A three-way catalyst 11 is disposed in the exhaust manifold 10, and a lean NOx catalyst 16 is disposed downstream of the three-way catalyst 11. An A/F sensor 12 is mounted between the cylinder 9 and the three-way catalyst 11.

An exhaust gas recirculation passage (EGR passage) 18 is disposed to communicate the intake manifold 4 and the exhaust manifold 10 with each other while bypassing the cylinder 9. An EGR valve 19 is disposed in the EGR passage.

An air-flow sensor 2 is disposed in the intake manifold 4 of the intake system to detect the amount of the intake air. A crank angle sensor 15 outputs a signal per 1 degree of rotational angle of a crankshaft. A throttle opening sensor 17 mounted to the electronic throttle 3 detects the opening of the electronic throttle 3. A water temperature sensor 14 detects the temperature of cooling water in the internal combustion engine 20. An accelerator opening sensor 13 detects the amount by which an accelerator 6 is depressed, to thereby detect the torque demanded by a driver.

Respective signals from the accelerator opening sensor 13, the air-flow sensor 2, the throttle opening sensor 17, the crank angle sensor 15, and the water temperature sensor 14 are sent to the control unit (control device) 50, which determines the operating state of the internal combustion engine 20 from respective outputs of those sensors and computes optimum values of main control variables for the internal combustion engine 20, such as the intake air amount, the fuel injection amount, and the ignition timing. The fuel injection amount computed in the control unit 50 is converted to a valve-opening pulse signal that is sent to the fuel injection valve 7.

Also, the predetermined ignition timing is computed in the control unit 50 for the ignition at the predetermined ignition timing, and a drive signal from the control unit 50 is outputted to the ignition plug 8 so that the ignition is performed at the computed ignition timing. The intake air introduced through the intake system is adjusted by the electronic throttle 3, is mixed with the recirculated exhaust gas after being adjusted by the EGR valve 19, and then flows into the cylinder 9 through the intake valve 27.

Fuel injected from the fuel injection valve 7 into the cylinder (combustion chamber) 9 is mixed in the air introduced from the intake manifold 4 to form an air-fuel mixture. The air-fuel mixture is burnt for explosion upon application of a spark generated from the ignition plug 8 at the predetermined ignition timing, and a piston 29 is depressed by the combustion pressure to produce power for the internal combustion engine 20. Exhaust gases after the explosion are sent to the three-way catalyst 11 through the exhaust manifold 10. The lean NOx catalyst 16 is disposed downstream of the three-way catalyst 11. During a lean operation, the lean NOx catalyst 16 stores NOx discharged from the internal combustion engine 20. By changing an operation mode to a rich operation, the lean NOx catalyst 16 desorbs and cleans the stored NOx for exhausting to the exterior.

The amount of the recirculated exhaust gas returned to the intake side through the exhaust gas recirculation pipe 18 is controlled by the EGR valve 19, and the A/F sensor 12 has a linear output characteristic with respect to the concentration of oxygen contained in the exhaust gases. Since the relationship between the concentration of oxygen contained in the exhaust gases and an air/fuel ratio is substantially linear, the air/fuel ratio in the internal combustion engine 20 can be determined by using the A/F sensor 12 that detects the concentration of oxygen.

The control unit 50 has the functions of computing the air/fuel ratio upstream of the three-way catalyst 11 based on a signal from the A/F sensor 12, and executing feedback F/B control to sequentially modify the fuel injection amount or the air amount so that the air/fuel ratio of the air-fuel mixture within the cylinder 9 of the internal combustion engine 20 is matched with a target air/fuel ratio.

Figure 27:
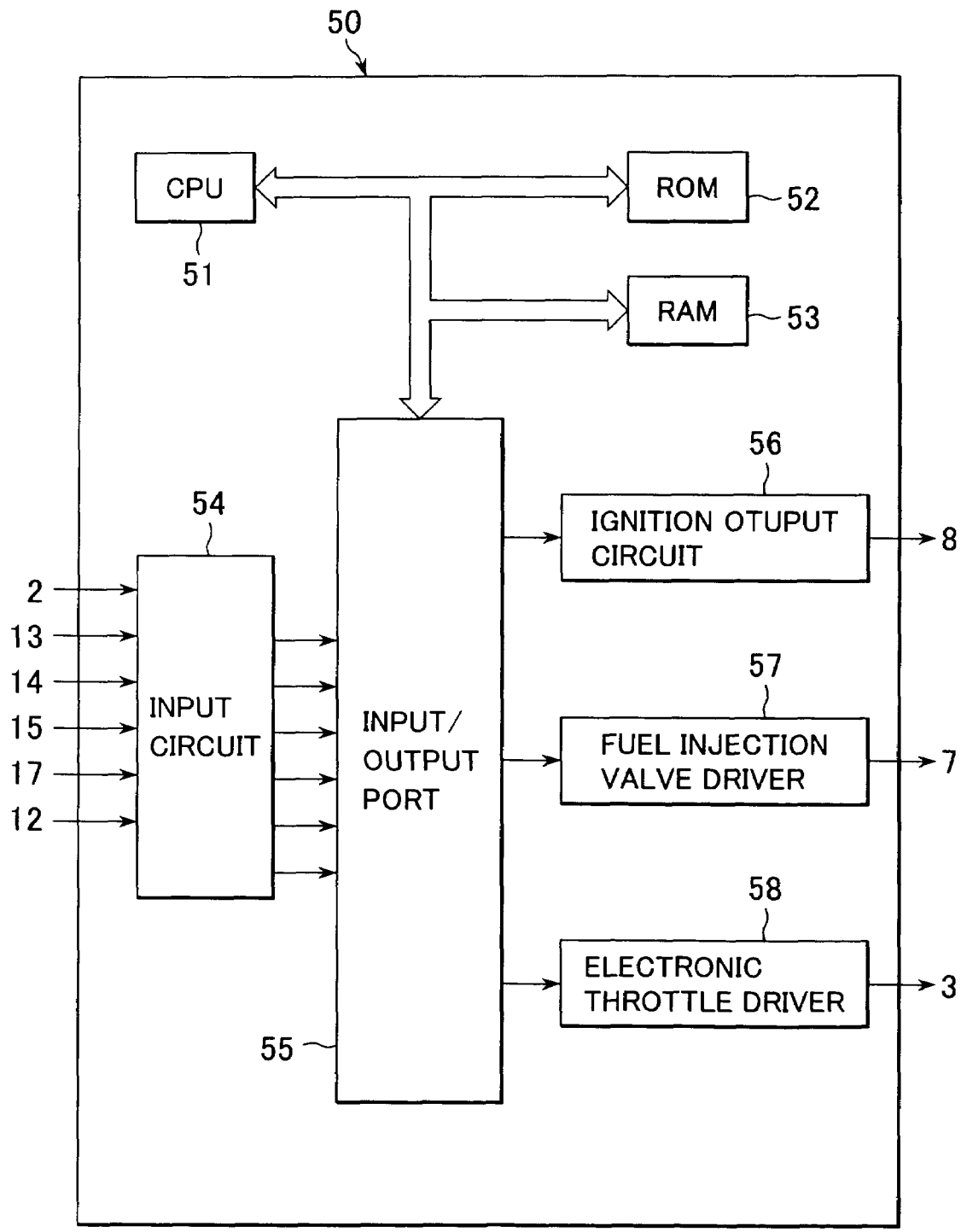
FIG. 27 is a block diagram showing an internal configuration of the internal combustion engine control device (control unit) shown in FIG. 26.

FIG. 27 shows an internal configuration of the control unit (ECU) 50 for the internal combustion engine 20 shown in FIG. 26. The ECU 50 receives respective sensor output values from the A/F sensor 12, the accelerator opening sensor 13, the throttle valve opening sensor 17, the air-flow sensor 2, the crank angle sensor 15, and the water temperature sensor 14. The received values are subjected to signal processing, such as noise removal, in an input circuit 54 and then sent to an input/output port 55. The values sent to the input/output port 55 are stored in a RAM 53 and used for arithmetic/logical processing executed in a CPU 51. A control program describing details of the arithmetic/logical processing is written in a ROM 52 in advance.

Values computed in accordance with the control program and representing respective amounts by which actuators are to be operated are stored in the RAM 53 and then sent to the input/output port 55. A signal for operating the ignition plug 8 at the time of causing spark ignition for combustion is set as an ON/OFF signal that is turned on when a current is supplied to a primary coil in an ignition output circuit 56, and is turned off when no current is supplied to the primary coil. The ignition timing is given as the time at which the ON/OFF signal is turned from an on-state to an off-state. The ignition plug signal set in the input/output port 55 is amplified in the ignition output circuit 56 to a level of energy sufficient to effectuate the combustion and is supplied to the ignition plug 8. Also, a drive signal for the fuel injection valve 7 is set as an ON/OFF signal that is turned on when the valve is opened, and is turned off when the valve is closed. This drive signal is amplified in a fuel injection valve driver 57 to a level of energy sufficient to open the fuel injection valve 7 and is sent to the fuel injection valve 7.

A drive signal for realizing the target opening of the electronic throttle valve 3 is sent to the electronic throttle 3 via an electronic throttle driver 58.

The control program written in the ROM 52 will be described below.

Figure 28:
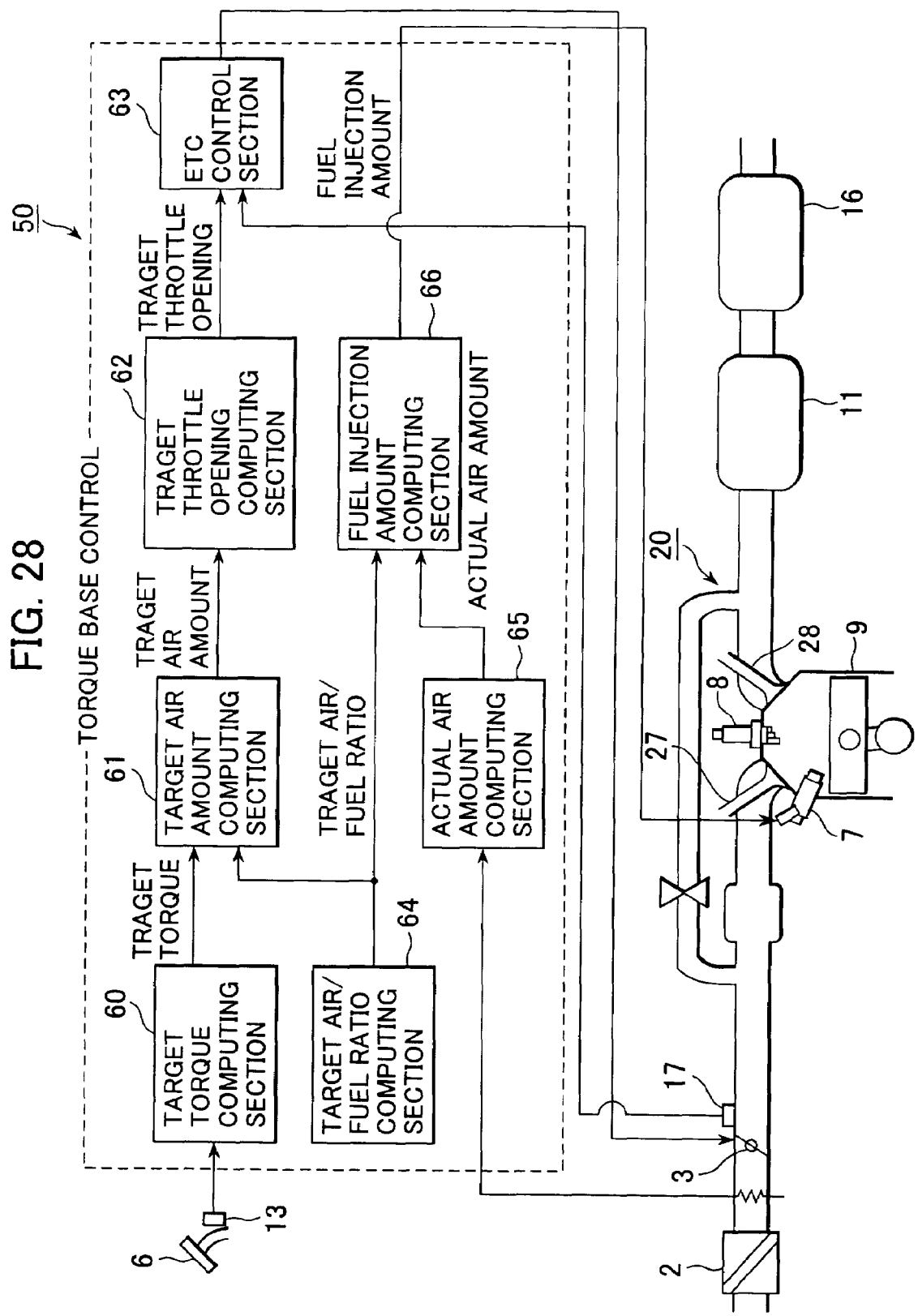
FIG. 28 is a control block diagram of the control device shown in FIG. 27.

FIG. 28 is a control block diagram showing the entirety of the control device 50 for the internal combustion engine 20 according to this embodiment, the diagram showing principal components for use in torque demand-based control of the air preference type. The control device 50 of this embodiment comprises a target torque computing section 60, a target air amount computing section 61, a target throttle opening computing section 62, an ETC (electronic throttle) control section 63, a target air/fuel ratio computing section 64, an actual air amount computing section 65, and a fuel injection amount computing section 66.

First, the target torque computing section 60 computes a target torque from the accelerator opening. Then, the target air amount computing section 61 computes a target air amount from the target torque and a target air/fuel ratio, and the target throttle opening computing section 62 computes a target throttle opening to realize the target air amount. The ETC control section 63 executes F/B control of the throttle opening in accordance with an output of the opening sensor 17. The fuel injection amount computing section 66 computes a fuel injection amount from both the actual air amount detected by the air-flow sensor 2 and the target air/fuel ratio.

An essential feature of this embodiment resides in a process executed in the target air/fuel ratio computing section 64. Since the other computing sections are already well known and explained in many documents, a detailed description of those other computing sections is omitted here.

Details of the target air/fuel ratio computing section 64 will be described below.

Figure 29:
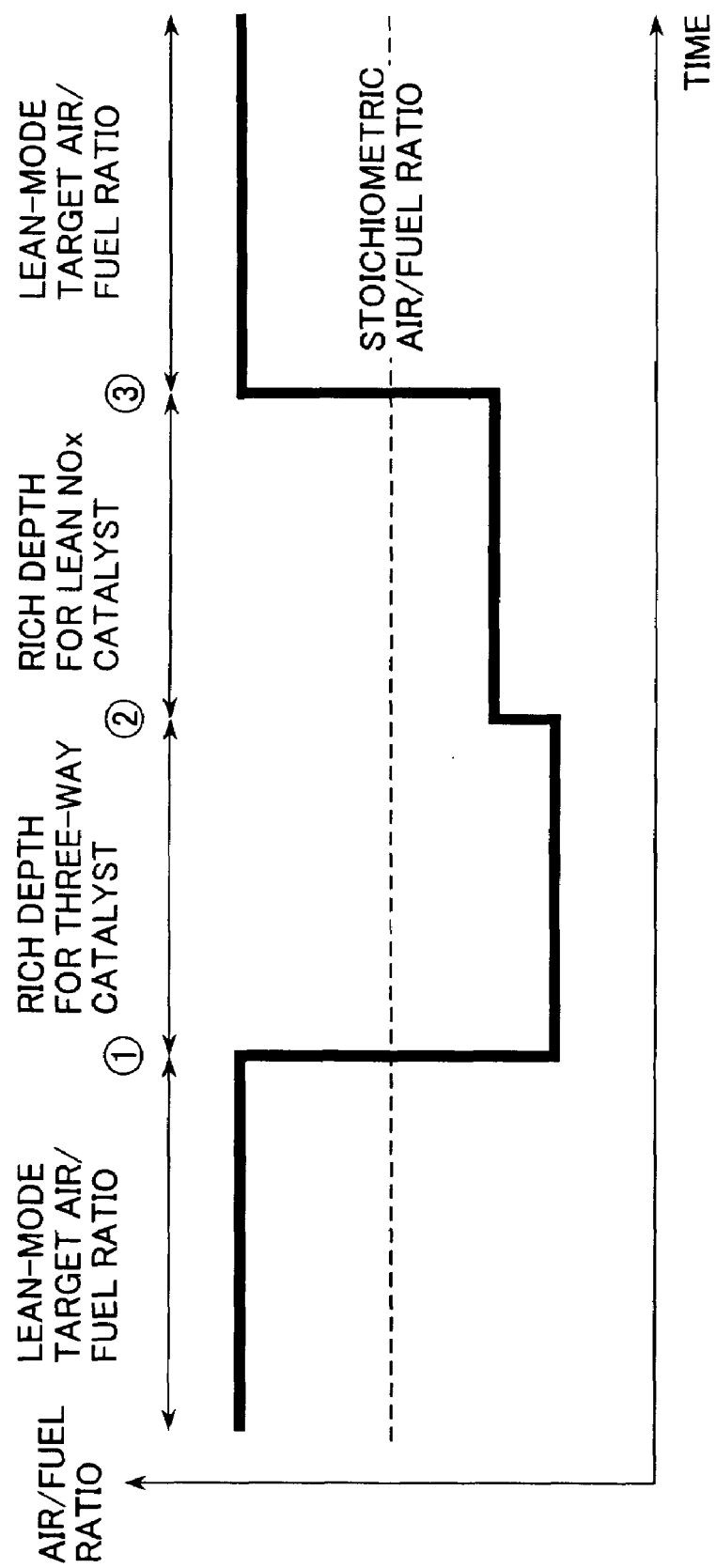
FIG. 29 is a chart showing a target air/fuel ratio during a lean operation and a rich operation in the first to fourth embodiments of the present invention.
Figure 30:
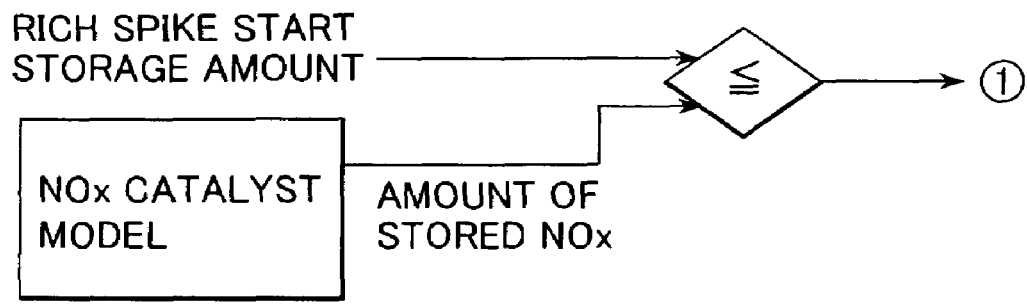
FIG. 30 is a block diagram showing prerequisites for satisfying a condition ① in FIG. 29.

FIG. 29 is a chart showing the target air/fuel ratio during the lean operation and the rich operation. During the lean operation, the operation is controlled using a lean-mode target air/fuel ratio, and when a condition ① in FIG. 29 is satisfied, the target air/fuel ratio is changed to a rich depth for the three-way catalyst. As shown in FIG. 30, the condition ① is satisfied when the amount of the stored NOx computed using a NOx catalyst model reaches a predetermined value, i.e., a storage amount for start of the rich spike.

Figure 31:
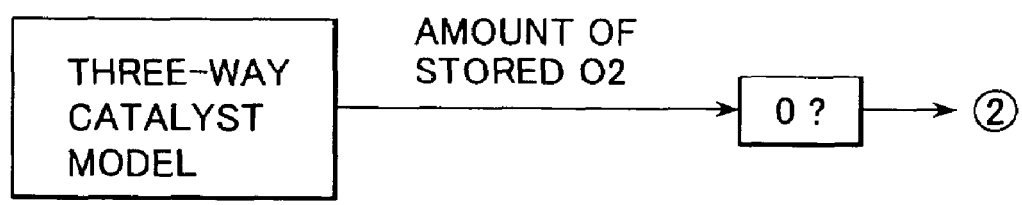
FIG. 31 is a block diagram showing prerequisites for satisfying a condition ② in FIG. 29.

Further, when a condition ② in FIG. 29 is satisfied, the rich depth is changed to a rich depth for the NOx catalyst. As shown in FIG. 31, the condition ② is satisfied when the amount of the stored $O_2$ has become 0.

Figure 32:
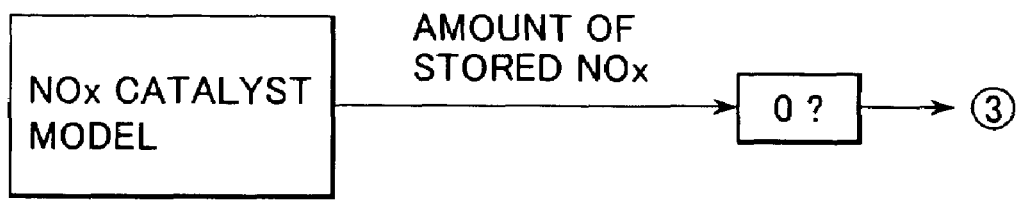
FIG. 32 is a block diagram showing prerequisites for satisfying a condition ③ in FIG. 29.

Then, when a condition ③ in FIG. 29 is satisfied, the rich spike is brought to an end and the operation mode is returned to the lean operation again. As shown in FIG. 32, the condition ③ is satisfied when the amount of the stored NOx has become 0.

Figure 33:
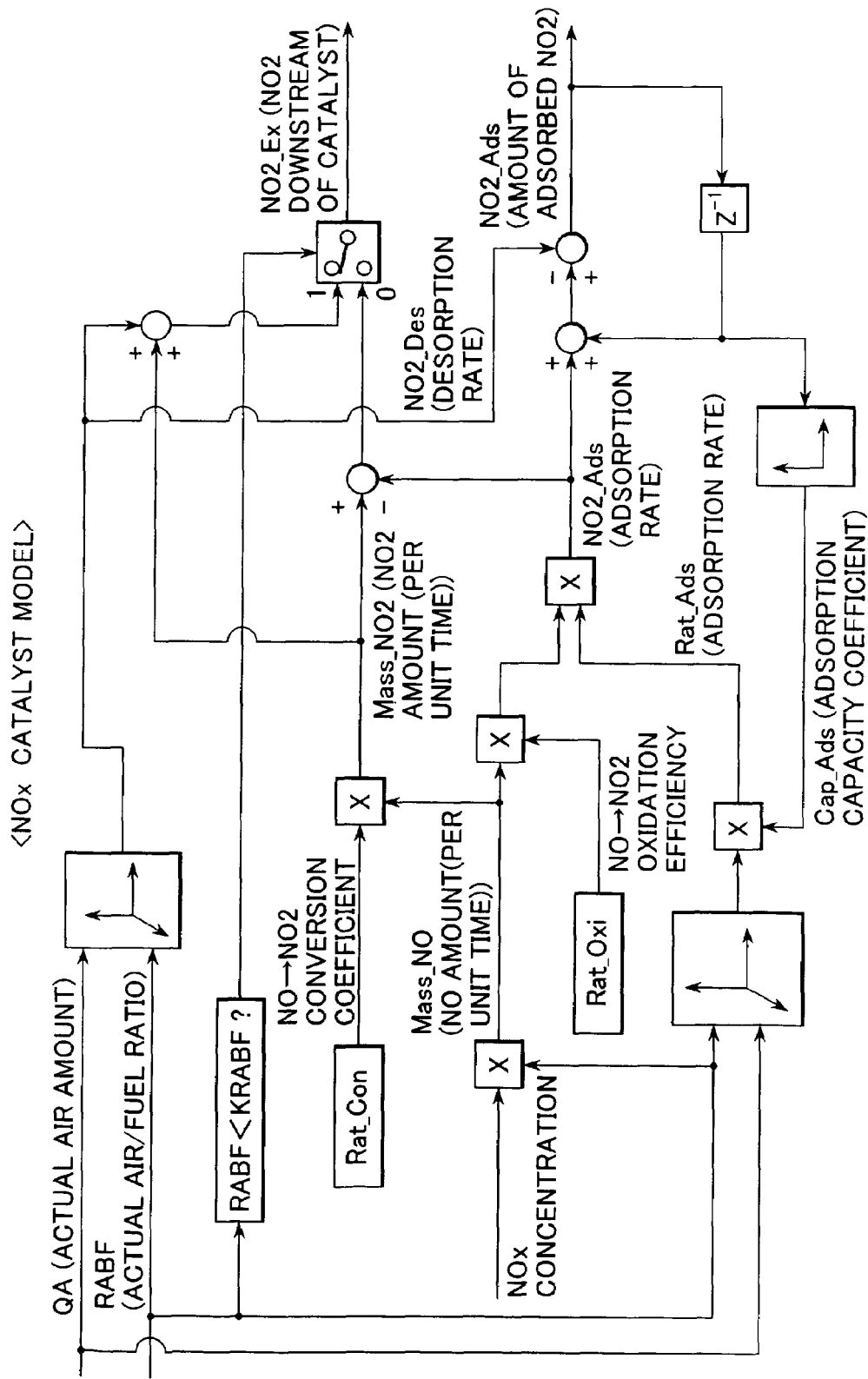
FIG. 33 shows a lean NOx catalyst model in the first to fifth embodiments of the present invention.

FIG. 33 shows the NOx catalyst model. Whether the NOx catalyst is in an absorptive (occludent) state or a desorptive state is determined based on an actual air/fuel ratio RABF. More specifically, in the case of RABF<KRABF, a reducing atmosphere is produced to bring the NOx catalyst into the desorptive state. A desorption rate $NO_2\_Des$ is obtained by referring to a map based on an actual air amount QA and the actual air/fuel ratio RABF. $NO_2$ downstream of the catalyst is given as the sum of the desorbed NOx and NOx discharged out of the internal combustion engine. Also, processing executed in an oxidizing atmosphere, i.e., in the adsorptive state, is as follows:
(1) NOx discharged out of the internal combustion engine is multiplied by the air amount QA per unit time for conversion to a NO amount Mass_NO per unit time.
(2) Mass_NO is multiplied by Rat_Oxi (i.e., oxidation efficiency from NO to $NO_2$) for conversion to a NO2 amount Mass_NO2 per unit time.
(3) Mass_NO2 is multiplied by an adsorption rate Rat_Ads to compute an adsorption rate $NO_2\_Ads$. It is assumed that Rat_Ads is provided as a value obtained by referring to a map based on an adsorption capacity coefficient Cap_Ads, QA and RABF, or provided as the product thereof.
(4) An amount of adsorbed $NO_2$ at a time t is obtained by summing the adsorption rate $NO_2\_Ads$ and deducting the desorption rate NO2_Des.

Incidentally, the adsorption capacity coefficient Cap_Ads is obtained by referring to a map based on the amount of the adsorbed $NO_2$ at the time t. Various parameters used in the above-mentioned model are preferably set in match with characteristics of the catalyst.

Figure 34:
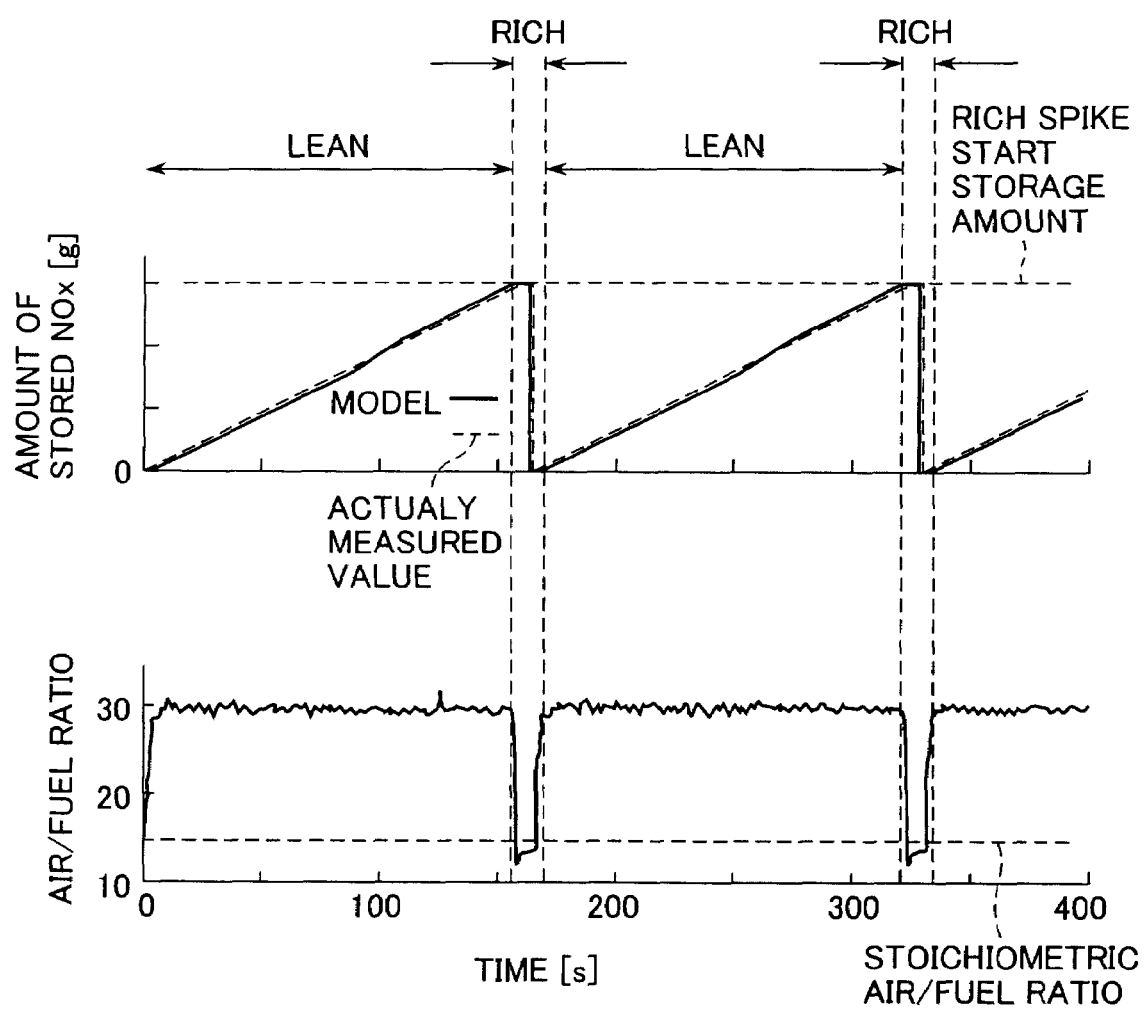
FIG. 34 is a graph showing a test result 1 of an actual device according to the first embodiment.

FIG. 34 is a graph showing a test result of an actual device according to the first embodiment. The horizontal axis represents time, and the vertical axis represents the amount of the stored NOx or the air/fuel ratio. As seen from FIG. 34, when the amount of the stored NOx is computed using the NOx catalyst model with high accuracy and reaches the storage amount for start of the rich spike, the air/fuel ratio is changed to a rich value to start the rich spike. Also, the air/fuel ratio differs between the first half and the second half of the rich operation. Further, after the lapse of a predetermined period, i.e., when the desorption of $O_2$ stored in the three-way catalyst 11 has been completed and the desorption and cleaning of NOx stored in the NOx catalyst 16 have been completed, the rich spike is brought to an end for return to the lean operation.

Figure 35:
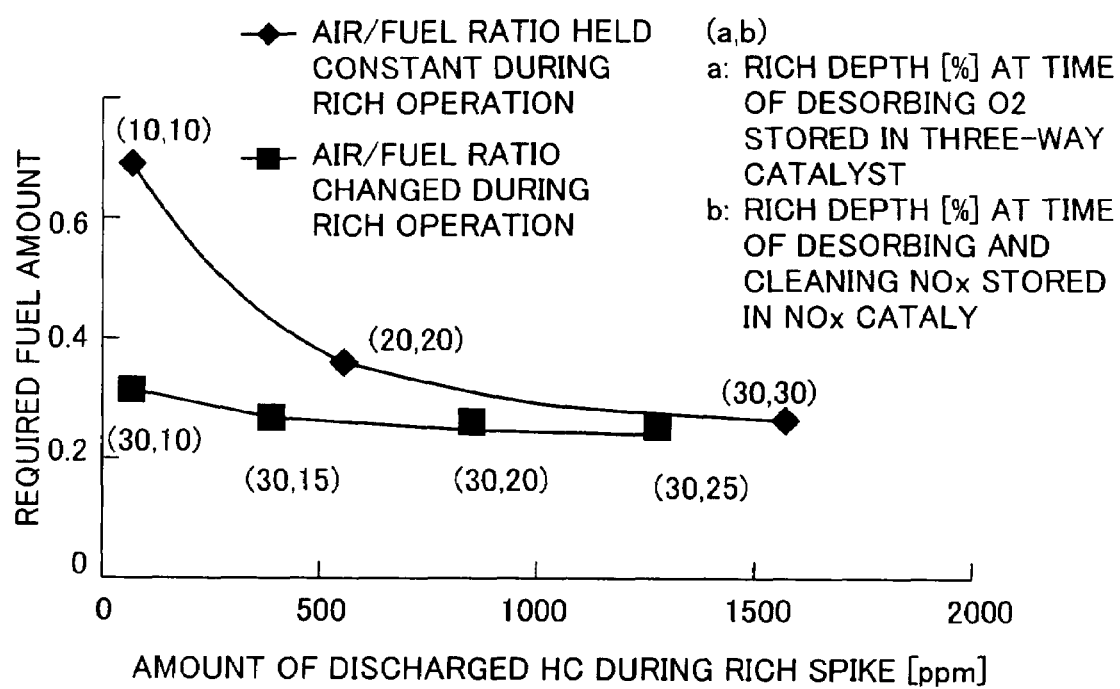
FIG. 35 is a graph showing a test result 2 of the actual device according to the first embodiment.

FIG. 35 shows comprehensive evaluation results when the air/fuel ratio is held constant during the rich spike (rich operation), and when the air/fuel ratio is changed. The horizontal axis represents the amount of HC discharged during the rich spike, and the vertical axis represents the fuel consumption. Because the rich spike time is optimized, any of the above two cases satisfies the conditions that the cleaning efficiency of the stored NOx is not less than 95% and the cleaning efficiency of CO is not less than 80%.

When the air/fuel ratio is held constant, the amount of the discharged HC is suppressed by reducing the rich depth, but the fuel economy deteriorates. By increasing the rich depth, the fuel economy is improved, but the amount of the discharged HC increases. When the air/fuel ratio is changed, fuel economy is generally at a good level. In particular, it is seen that the fuel consumption and the amount of the discharged HC are both held down low in the case of rich depth (30%, 10%).

SECOND EMBODIMENT

Respective diagrams of an overall control system, a control unit, and a control block of an internal combustion engine control device according to a second embodiment of the present invention are the same as those of the internal combustion engine control device according to the first embodiment, shown in FIGS. 26 through 28, and hence a detailed description thereof is omitted here.

Further, a chart of the target air/fuel ratio during the lean operation and the rich operation is the same as that in the first embodiment, shown in FIG. 29, and hence a detailed description thereof is also omitted here.

Moreover, during the lean operation, the operation is controlled using a lean-mode target air/fuel ratio, and the condition ① for changing to the rich depth for the three-way catalyst when it is satisfied, i.e., the condition ① in FIG. 29, is the same as that in the first embodiment, shown in FIG. 30. In addition, a NOx catalyst model is also the same as that in the first embodiment, shown in FIG. 33. Therefore, a description of those points is omitted here.

Figure 36:
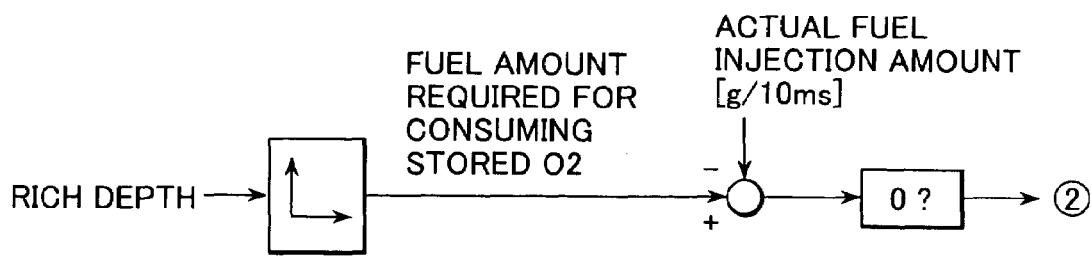
FIG. 36 is a block diagram showing prerequisites for satisfying the condition ② in FIG. 29 in the second embodiment.

In this second embodiment, when the condition ② in FIG. 29 is satisfied, the rich depth is changed to a rich depth for the NOx catalyst. As shown in FIG. 36, the condition ② is satisfied when the actual fuel injection amount is sequentially subtracted from the fuel amount required for desorbing the stored $O_2$ with the lapse of time and the required fuel injection amount has become 0. The cycle and amount at and by which the subtraction is executed are set depending on the control cycle. The fuel amount required for desorbing the stored $O_2$ is decided depending on the catalyst characteristics (as shown in FIG. 24).

Figure 37:
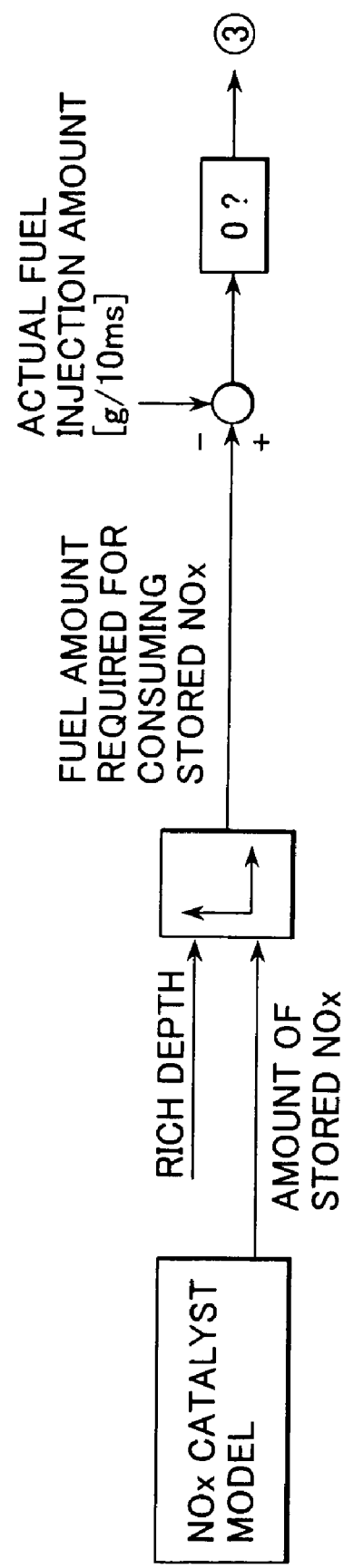
FIG. 37 is a block diagram showing prerequisites for satisfying the condition ③ in FIG. 29 in the second embodiment.

Then, when the condition ③ in FIG. 29 is satisfied, the rich spike is brought to an end and the operation mode is returned to the lean operation again. As shown in FIG. 37, the condition ③ is satisfied when the actual fuel injection amount is sequentially subtracted from the fuel amount required for desorbing and cleaning the stored NOx with the lapse of time and the required fuel injection amount has become 0. The cycle and amount at and by which the subtraction is executed are set depending on the control cycle. The fuel amount required for cleaning the stored NOx can be determined depending on the rich depth and the stored NOx (as shown in FIG. 25), but they are preferably decided depending on the catalyst characteristics. The control process executed according to this second embodiment can also provide similar results to those mentioned above with reference to FIGS. 34 and 35.

THIRD EMBODIMENT

Figure 38:
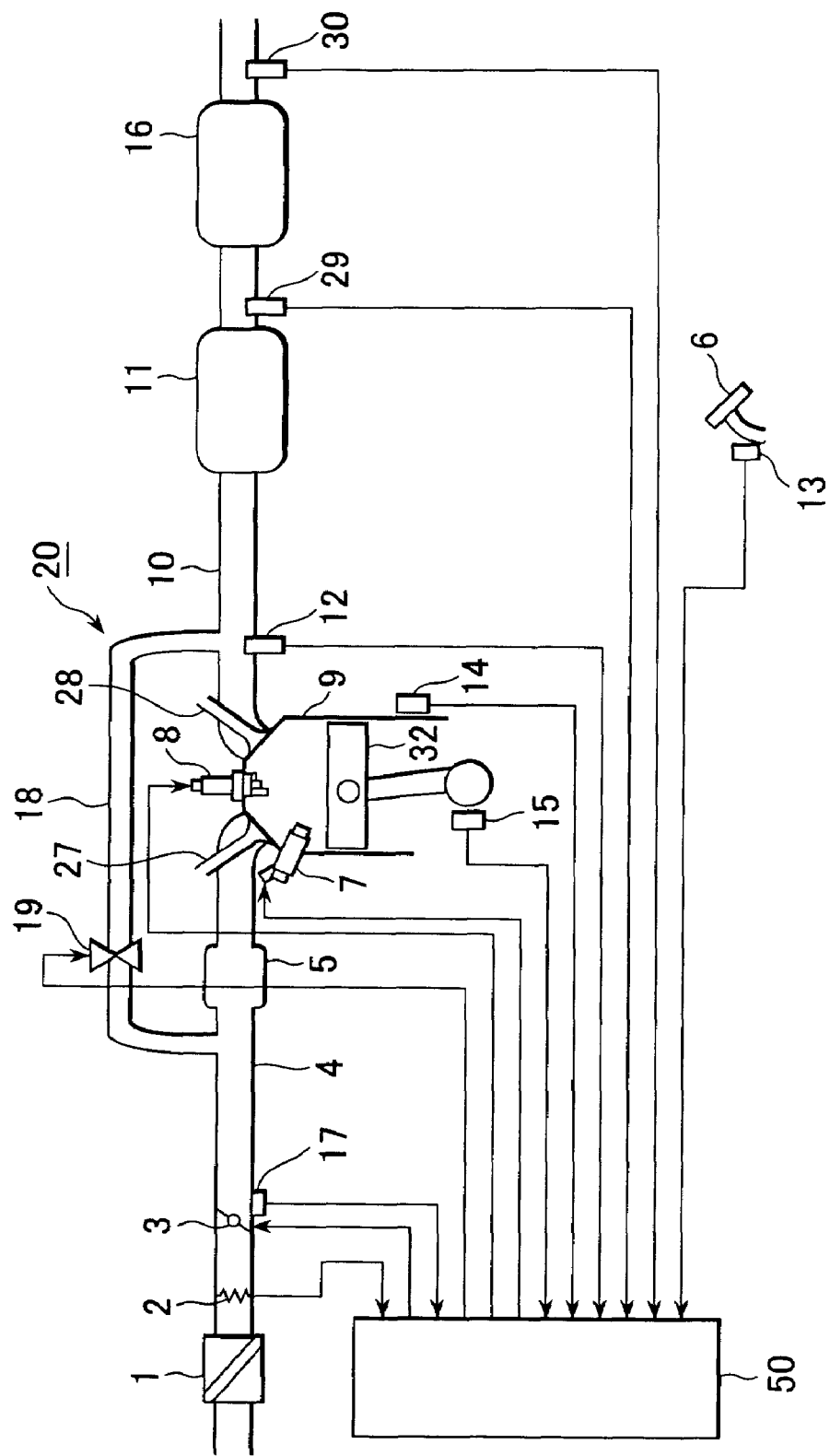
FIG. 38 is a schematic view of an overall control system in a third embodiment of the internal combustion engine control device according to the present invention.

FIG. 38 shows an overall system of an internal combustion engine in a third embodiment to which the internal combustion engine control device of the present invention is applied. The overall system of the internal combustion engine in this third embodiment is constructed by adding an O2 sensor 29 downstream of the three-way catalyst 11 and an $O_2$ sensor 30 downstream of the NOx catalyst 16 in the overall system of the internal combustion engine in the first embodiment. The other construction is the same as that in the first embodiment.

Figure 39:
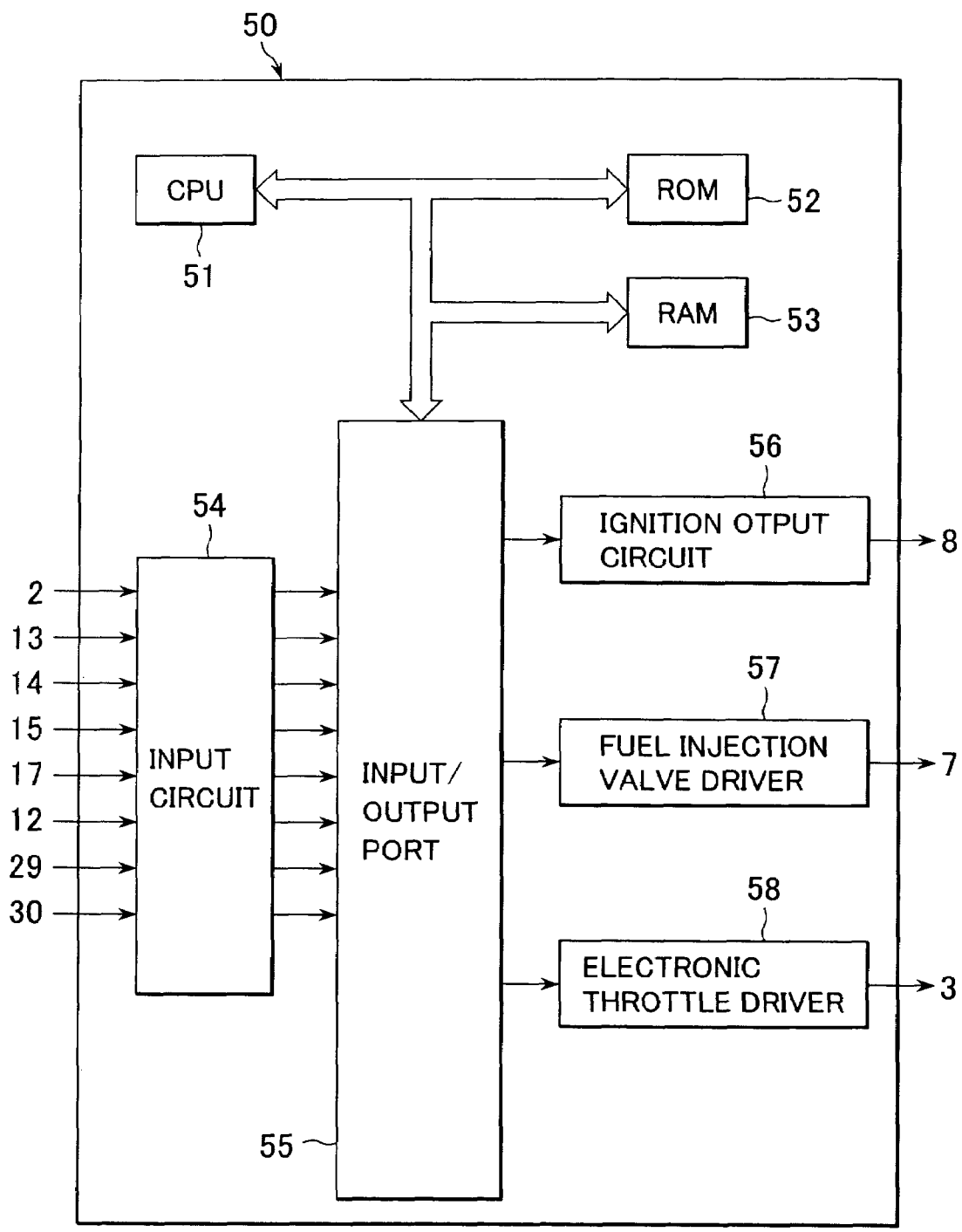
FIG. 39 is a block diagram showing an internal configuration of the internal combustion engine control device (control unit) shown in FIG. 38.

FIG. 39 shows an internal configuration of the internal combustion engine control device (control unit) 50. The internal combustion engine control device 50 of this third embodiment differs from the control device 50 of the first embodiment in additionally receiving input signals from both the $O_2$ sensor 29 downstream of the three-way catalyst 11 and the $O_2$ sensor 30 downstream of the NOx catalyst 16. The other construction is the same as that in the first embodiment.

Also, a control block diagram of the internal combustion engine control device 50 of this third embodiment is the same as that of the first embodiment, shown in FIG. 28, and hence a detailed description thereof is omitted here.

Further, a chart of the target air/fuel ratio during the lean operation and the rich operation is the same as that in the first embodiment, shown in FIG. 29, and hence a detailed description thereof is also omitted here.

Moreover, during the lean operation, the operation is controlled using a lean-mode target air/fuel ratio, and the condition ① for changing to the rich depth for the three-way catalyst when it is satisfied, i.e., the condition ① in FIG. 29, is the same as that in the first embodiment, shown in FIG. 30. In addition, a NOx catalyst model is also the same as that in the first embodiment, shown in FIG. 33. Therefore, a description of those points is omitted here.

Figure 40:
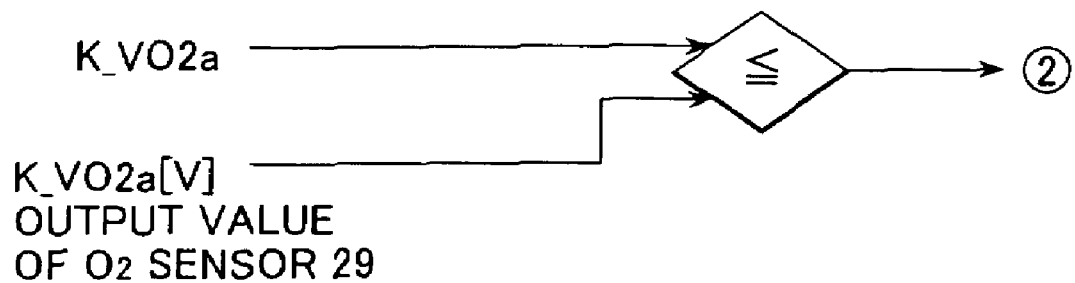
FIG. 40 is a block diagram showing prerequisites for satisfying the condition ② in FIG. 29 in the third and fourth embodiments.

In this third embodiment, when the condition ② in FIG. 29 is satisfied, the rich depth is changed to a rich depth for the NOx catalyst. As shown in FIG. 40, the condition ② is satisfied when an output value $VO_2a$ [V] of the $O_2$ sensor 29 has become equal to or larger than a predetermined value $K\_VO_2a$. While $K\_VO_2a$ is preferably decided based on experiences, it is generally set in the range of about 0.5–0.8 [V].

Figure 41:
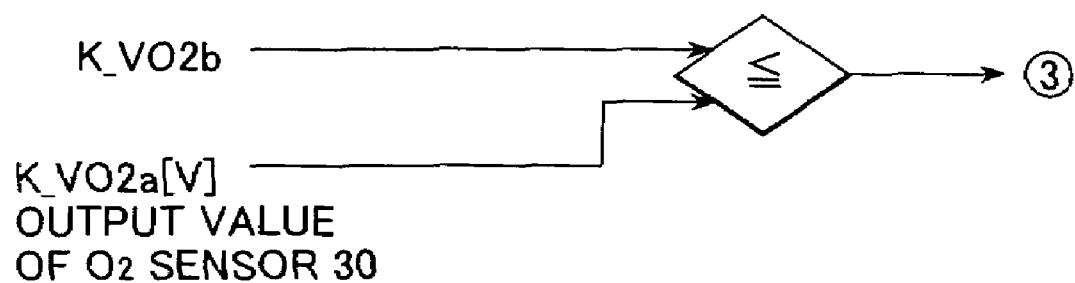
FIG. 41 is a block diagram showing prerequisites for satisfying the condition ③ in FIG. 29 in the third embodiment.

Then, when the condition ③ in FIG. 29 is satisfied, the rich spike is brought to an end and the operation mode is returned to the lean operation again. As shown in FIG. 41, the condition ③ is satisfied when an output value $VO_2b$ [V] of the $O_2$ sensor 30 has become equal to or larger than a predetermined value $K\_VO_2b$. While $K\_VO_2b$ is preferably decided based on experiences, it is generally set in the range of about 0.5–0.8 [V]. The control process executed according to this third embodiment can also provide similar results to those mentioned above with reference to FIGS. 34 and 35.

FOURTH EMBODIMENT

Figure 42:
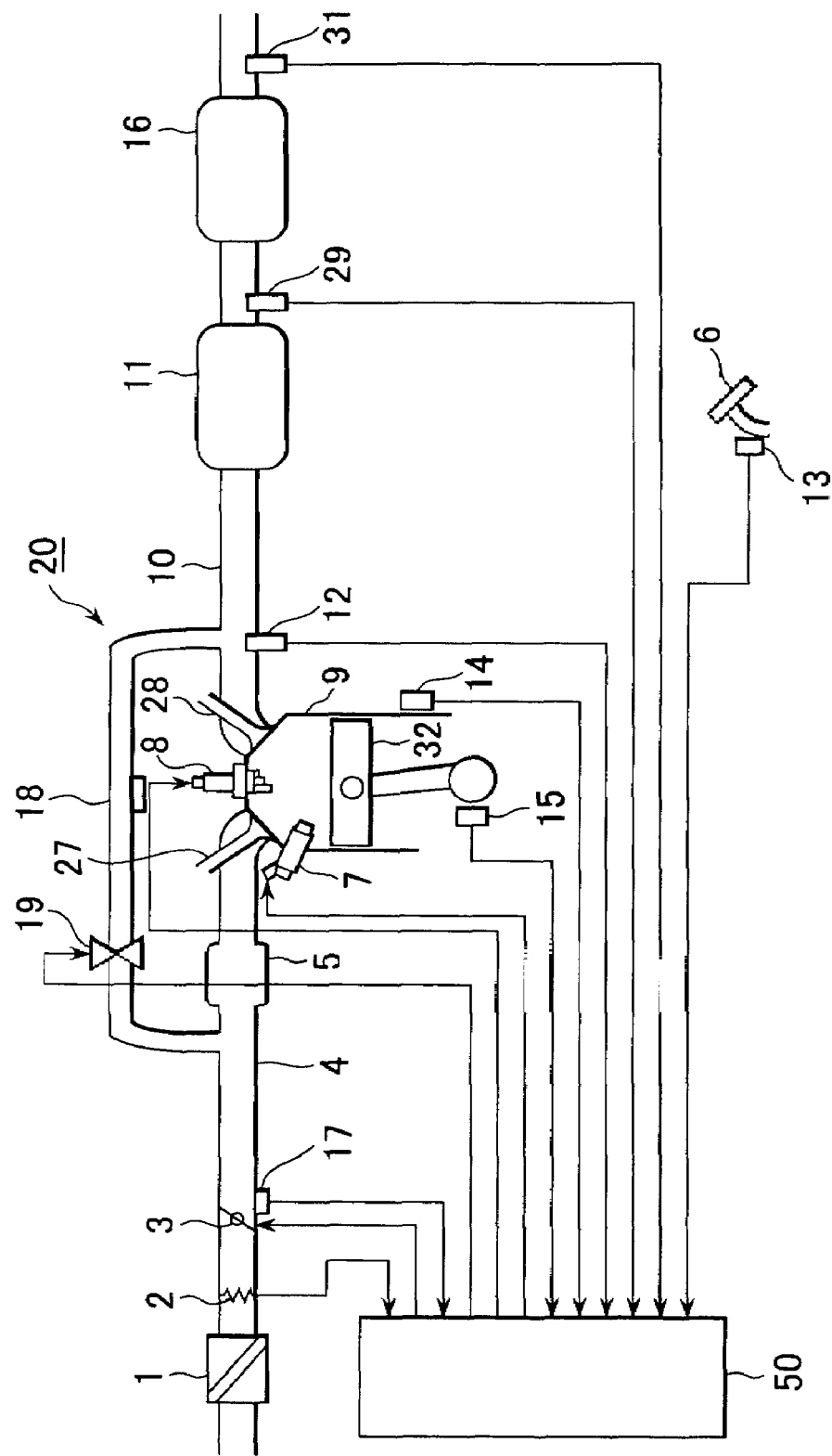
FIG. 42 is a schematic view of an overall control system in a fourth embodiment of the internal combustion engine control device according to the present invention.

FIG. 42 shows an overall system of an internal combustion engine in a fourth embodiment to which the internal combustion engine control device of the present invention is applied. The overall system of the internal combustion engine in this fourth embodiment is constructed by adding an O2 sensor 29 downstream of the three-way catalyst 11 and a NOx sensor 31 downstream of the NOx catalyst 16 in the overall system of the internal combustion engine in the first embodiment. The other construction is the same as that in the first embodiment.

Figure 43:
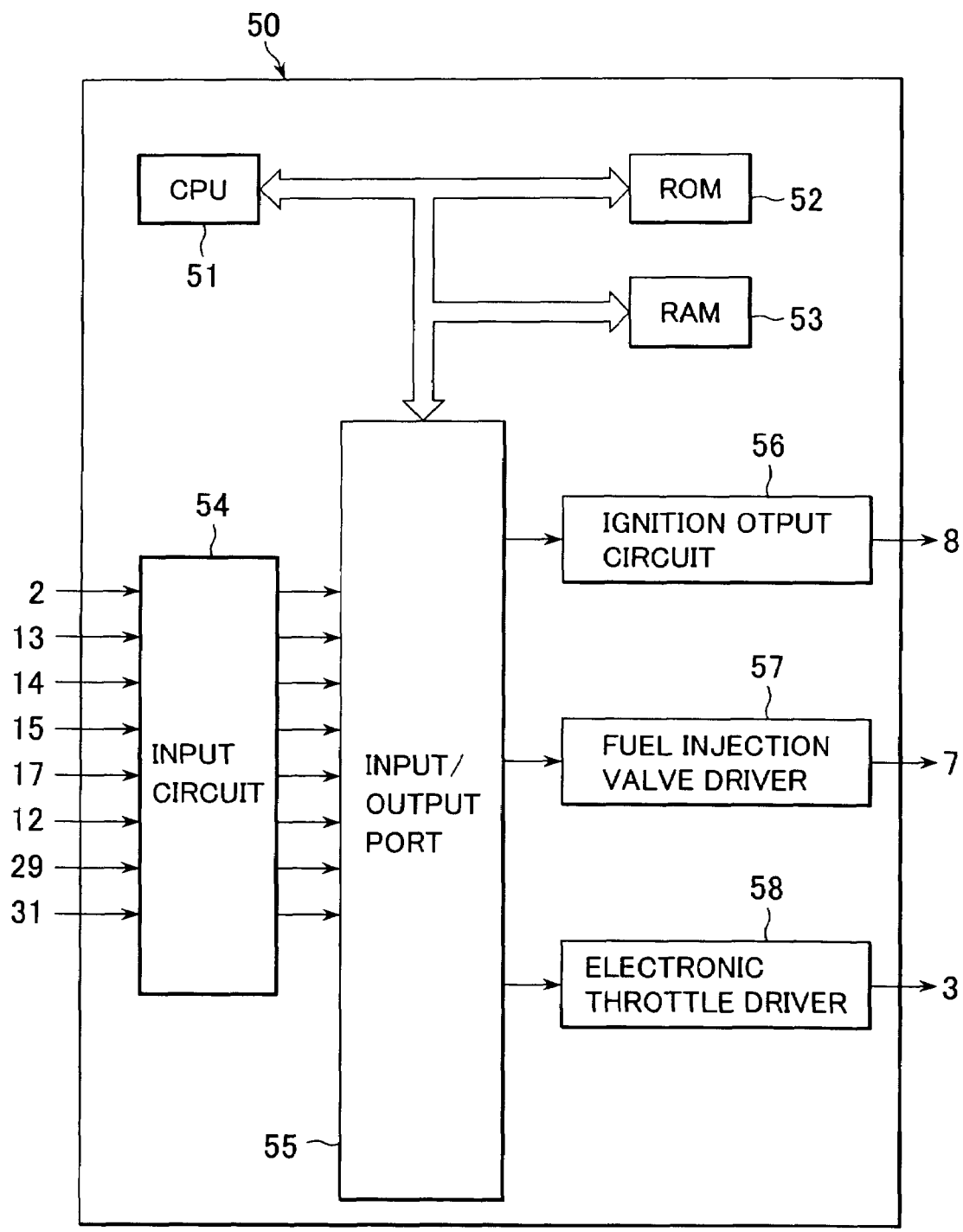
FIG. 43 is a block diagram showing an internal configuration of the internal combustion engine control device (control unit) shown in FIG. 42.

FIG. 43 shows an internal configuration of the internal combustion engine control device (control unit) 50. The internal combustion engine control device 50 of this fourth embodiment differs from the control device 50 of the first embodiment in additionally receiving input signals from both the $O_2$ sensor 29 downstream of the three-way catalyst 11 and the NOx sensor 31 downstream of the NOx catalyst 16. The other construction is the same as that in the first embodiment.

Also, a control block diagram of the internal combustion engine control device 50 of this fourth embodiment is the same as that of the first embodiment, shown in FIG. 28, and hence a detailed description thereof is omitted here.

Further, a chart of the target air/fuel ratio during the lean operation and the rich operation is the same as that in the first embodiment, shown in FIG. 29, and hence a detailed description thereof is also omitted here.

Moreover, during the lean operation, the operation is controlled using a lean-mode target air/fuel ratio, and the condition ① for changing to the rich depth for the three-way catalyst when it is satisfied, i.e., the condition ① in FIG. 29, is the same as that in the first embodiment, shown in FIG. 30. In addition, a NOx catalyst model is also the same as that in the first embodiment, shown in FIG. 33. Therefore, a description of those points is omitted here.

Figure 44:
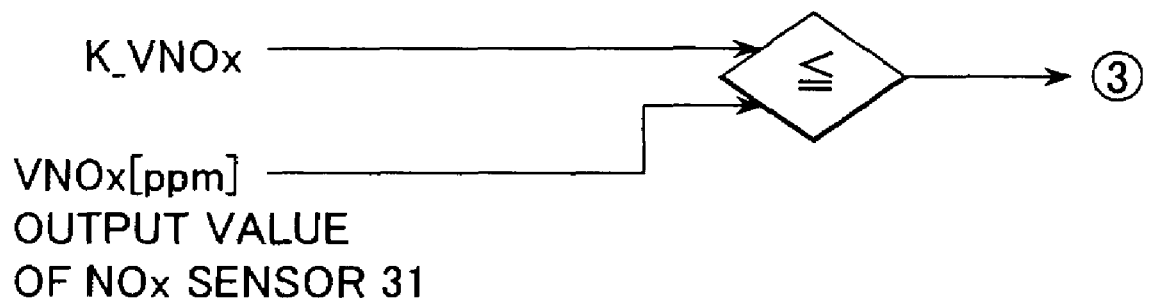
FIG. 44 is a block diagram showing prerequisites for satisfying the condition ③ in FIG. 29 in the fourth embodiment.

In this fourth embodiment, when the condition ② in FIG. 29 is satisfied, the rich depth is changed to a rich depth for the NOx catalyst. The condition ② is the same as that in the third embodiment, shown in FIG. 40, and hence a detailed description thereof is omitted here. Then, when the condition ③ in FIG. 29 is satisfied, the rich spike is brought to an end and the operation mode is returned to the lean operation again. As shown in FIG. 44, the condition ③ is satisfied when an output value VNOx [ppm] of the NOx sensor 31 has become equal to or larger than a predetermined value K_VNOx. While K_VNOx is preferably decided based on experiences, it is generally set in the range of about several tens to several hundreds [ppm]. The control process executed according to this fourth embodiment can also provide similar results to those mentioned above with reference to FIGS. 34 and 35.

Some type of the NOx sensor 31 is able to detect the $O_2$ concentration based on the principles of detection. When the NOx sensor 31 is employed, it is possible to detect the timing of ending the desorption and cleaning of NOx stored in the lean NOx catalyst, by combining the control process of this fourth embodiment with the control process of the third embodiment. In other words, the timing of ending the desorption and cleaning of the stored NOx is detected based on the $O_2$ concentration and the NOx concentration downstream of the lean NOx catalyst 16.

FIFTH EMBODIMENT

Figure 45:
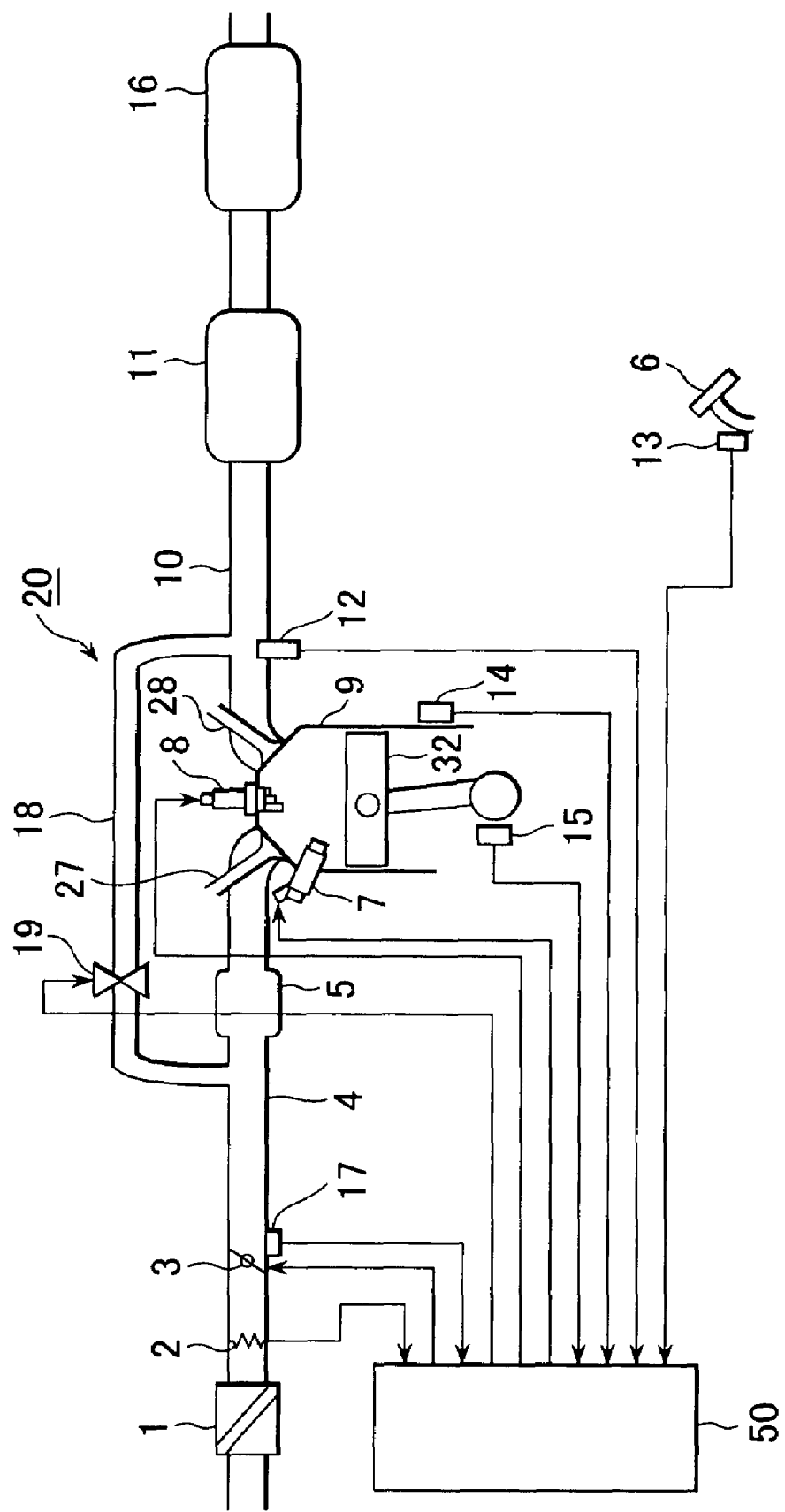
FIG. 45 is a schematic view of an overall control system in a fifth embodiment of the internal combustion engine control device according to the present invention.

FIG. 45 shows an overall system of an internal combustion engine in a fifth embodiment to which the internal combustion engine control device of the present invention is applied. The overall system of the internal combustion engine in this fifth embodiment differs from the overall system of the internal combustion engine in the first embodiment, shown in FIG. 26, in that the three-way catalyst 11 and the NOx catalyst 16 are arranged in a reversed order, i.e., in the downstream side and the upstream side, respectively. The other construction is the same as that in the first embodiment, and hence a detailed description thereof is omitted here.

Also, respective diagrams of a control unit and a control block in this fifth embodiment are the same as those in the first embodiment, shown in FIGS. 27 and 28, and hence a detailed description thereof is also omitted here.

Figure 46:
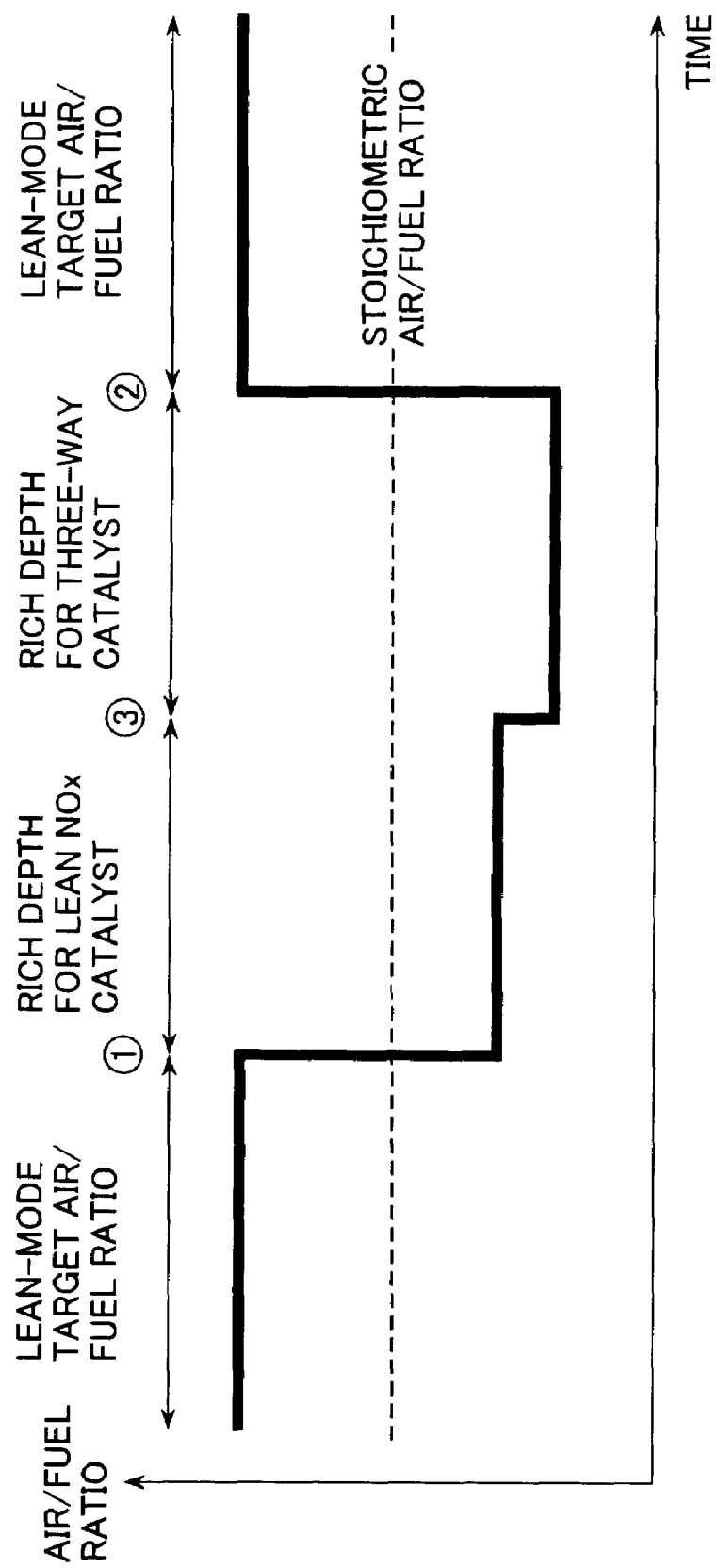
FIG. 46 is a chart showing a target air/fuel ratio during a lean operation and a rich operation in the fifth embodiment of the present invention.

FIG. 46 is a chart showing a target air/fuel ratio during the lean operation and the rich operation. During the lean operation, the operation is controlled using a lean-mode target air/fuel ratio, and when a condition ① in FIG. 46 is satisfied, the rich depth is changed to a rich depth for the NOx catalyst. The condition ① is the same as that in the first embodiment, shown in FIG. 30, and hence a description thereof is omitted here.

Moreover, when a condition ③ is satisfied, the rich depth is changed to a rich depth for the three-way catalyst. The condition ③ can be set to the same one as that in each of the first to fourth embodiments. Then, when a condition ② is satisfied, the rich spike is brought to an end and the operation mode is returned to the lean operation again. The condition ② can be set to the same one as that in each of the first to fourth embodiments. The control process executed according to this fifth embodiment can also provide similar results to those mentioned above with reference to FIGS. 34 and 35.

Thus, the present invention is intended for air/fuel ratio control of the "stepped rich spike type", which has been accomplished by focusing attention on the fact that the three-way catalyst 11 and the lean NOx catalyst 16 store oxidants having different properties, i.e., $O_2$ and NOx, and by finding based on experiments that an optimum air/fuel ratio in the rich spike applied to each catalyst differs between those two catalysts.

While the air/fuel ratio in a period of desorbing and cleaning $O_2$ stored in the three-way catalyst is set to a richer value in any of the first to fifth embodiments of the present invention, it may be preferably set to a relatively leaner value in some cases. Because characteristics in the desorbing and cleaning process depend on concentrations of HC, CO discharged from the internal combustion engine, an air/fuel ratio optimum for both fuel economy and cleaning of the exhaust emissions is preferably determined depending on the performance of individual internal combustion engines.

INDUSTRIAL APPLICABILITY

As will be understood from the above description, the present invention provides, in relation to a lean-burn direct-injection internal combustion engine provided with a cleaner including a three-way catalyst and a lean NOx catalyst in an exhaust system, an internal combustion engine control device for, when NOx having been stored in the lean NOx catalyst during a lean operation is desorbed and cleaned by switching to a rich operation, optimizing an air/fuel ratio during the rich operation from the viewpoints of both better fuel economy and improved cleaning of the exhaust emissions.

The invention claimed is:

1. An internal combustion engine control device for use in a lean-burn internal combustion engine provided with a cleaner including a three way catalyst and a lean NOx catalyst in an exhaust pipe, wherein:
   said lean NOx catalyst has the function of storing NOx during a lean operation and of desorbing and cleaning the stored NOx by switching to a rich operation;
   said control device includes air/fuel ration changing means, said air/fuel changing means controlling an air/fuel ratio to be changed during the rich operation, wherein said air/fuel ratio changing means controls the air/fuel ratio to be changed to a plurality of predetermined air/fuel ratios during the rich operation; and said air/fuel ratio changing means controls the air/fuel ratio to be changed to different air/fuel ratios between the first half and the second half during the rich operation.

2. The internal combustion engine control device according to claim 1, wherein said three-way catalyst is disposed in the upstream side of said exhaust pipe and said lean NOx catalyst is disposed in the downstream side of said exhaust pipe, and wherein said control device controls the air/fuel ratio in the first half during the rich operation to be richer than the air/fuel ratio in the second half during the rich operation.

3. The internal combustion engine control device according to claim 1, wherein said lean NOx catalyst is disposed in the upstream side of said exhaust pipe and said three-way catalyst is disposed in the downstream side of said exhaust pipe, and wherein said control device controls the air/fuel ratio in the first half during the rich operation to be leaner than the air/fuel ratio in the second half during the rich operation.

4. The internal combustion engine control device according to claim 1, wherein said air/fuel ratio changing means controls the air/fuel ratio to be changed between a period in which $O_2$ stored in said three-way catalyst is desorbed during the rich operation and a period in which NOx stored in said lean NOx catalyst is desorbed and cleaned during the rich operation.

5. The internal combustion engine control device according to claim 4, wherein said control device includes means for directly or indirectly estimating an amount of $O_2$ stored in said three-way catalyst, and when the amount of the stored $O_2$ has become equal to or less than a predetermined value during the rich operation, said control device determines that the period of desorbing the $O_2$ stored in said three-way catalyst is completed, and controls said air/fuel ratio changing means for change of the air/fuel ratio.

6. The internal combustion engine control device according to claim 4, wherein said control device includes means for directly or indirectly estimating an amount of NOx stored in said lean NOx catalyst, and when the amount of the stored NOx has become equal to or less than a predetermined value during the rich operation, said control device determines that the period of desorbing and cleaning the NOx stored in said lean NOx catalyst is completed, and controls said air/fuel ratio changing means for change of the air/fuel ratio.

* * * * *

UNITED STATES PATENT AND TRADEMARK OFFICE
CERTIFICATE OF CORRECTION

PATENT NO. : 7,246,486 B2  
APPLICATION NO. : 10/545901  
DATED : July 24, 2007  
INVENTOR(S) : Shinji Nakagawa et al.

It is certified that error appears in the above-identified patent and that said Letters Patent is hereby corrected as shown below:

On the title page, column 1 should read:

(54) Internal Combustion Engine Control Device

(75) Inventors: Shinji Nakagawa, Hitachinaka (JP); Toshio Hori, Hitachinaka (JP); Mamoru Nemoto, Hitachiohta (JP); Masami Nagano, Hitachinaka (JP)

(86) PCT No.: PCT/JP03/05529

§ 371(c)(1),  
(2), (4) Date: Aug. 17, 2005

(87) PCT Pub. No.: WO04/097200

PCT Pub. Date: Nov. 11, 2004

Please delete Item (30), Foreign Application Priority Data.

Signed and Sealed this

Seventh Day of October, 2008

JON W. DUDAS  
*Director of the United States Patent and Trademark Office*

UNITED STATES PATENT AND TRADEMARK OFFICE
CERTIFICATE OF CORRECTION

PATENT NO. : 7,246,486 B2  Page 1 of 1
APPLICATION NO. : 10/545901
DATED : July 24, 2007
INVENTOR(S) : Shinji Nakagawa et al.

It is certified that error appears in the above-identified patent and that said Letters Patent is hereby corrected as shown below:

On the title page, column 1 and Column 1, lines 1-4, should read:

(54)  Internal Combustion Engine Control Device

(75)  Inventors:  Shinji Nakagawa, Hitachinaka (JP); Toshio Hori, Hitachinaka (JP); Mamoru Nemoto, Hitachiohta (JP); Masami Nagano, Hitachinaka (JP)

(86)  PCT No.:  PCT/JP03/05529

§ 371(c)(1),
  (2), (4) Date:  Aug. 17, 2005

(87)  PCT Pub. No.:  WO04/097200

PCT Pub. Date: Nov. 11, 2004

Please delete Item (30), Foreign Application Priority Data.

This certificate supersedes the Certificate of Correction issued October 7, 2008.

Signed and Sealed this

Twenty-first Day of October, 2008

JON W. DUDAS
*Director of the United States Patent and Trademark Office*